(12) United States Patent
Quinn et al.

(10) Patent No.: US 10,788,963 B2
(45) Date of Patent: Sep. 29, 2020

(54) ACCELERATED INSTANT REPLAY FOR CO-PRESENT AND DISTRIBUTED MEETINGS

(71) Applicant: Microsoft Technology Licensing, LLC, Redmond, WA (US)

(72) Inventors: Kori Inkpen Quinn, Redmond, WA (US); Rajesh Hedge, Redmond, WA (US); Zhengyou Zhang, Bellevue, WA (US); John Tang, Palo Alto, CA (US); Sasa Junuzovic, Carrboro, NC (US); Christopher Brooks, Saskatoon (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 15/953,219

(22) Filed: Apr. 13, 2018

(65) Prior Publication Data

US 2018/0232129 A1    Aug. 16, 2018

Related U.S. Application Data

(63) Continuation of application No. 14/327,421, filed on Jul. 9, 2014, now Pat. No. 9,977,574, which is a continuation of application No. 12/771,429, filed on Apr. 30, 2010, now Pat. No. 8,797,380.

(51) Int. Cl.
*G06F 3/0484* (2013.01)
*H04N 7/15* (2006.01)
(Continued)

(52) U.S. Cl.
CPC ....... *G06F 3/04842* (2013.01); *G06K 9/4676* (2013.01); *H04N 7/15* (2013.01);
(Continued)

(58) Field of Classification Search
CPC ... G06F 3/04842; G06K 9/4676; G10L 25/78; H04N 7/15; H04N 7/155; H04N 21/2387; H04N 21/47202
(Continued)

(56) References Cited

U.S. PATENT DOCUMENTS 9,977,574 B2 * 5/2018 Quinn ............... H04N 7/15
2007/0133437 A1 * 6/2007 Wengrovitz ......... H04M 3/56
370/260

(Continued)

*Primary Examiner* — Hemant S Patel
(74) *Attorney, Agent, or Firm* — Fiala & Weaver P.L.L.C.

(57) ABSTRACT

Techniques for recording and replay of a live conference while still attending the live conference are described. A conferencing system includes a user interface generator, a live conference processing module, and a replay processing module. The user interface generator is configured to generate a user interface that includes a replay control panel and one or more output panels. The live conference processing module is configured to extract information included in received conferencing data that is associated with one or more conferencing modalities, and to display the information in the one or more output panels in a live manner (e.g., as a live conference). The replay processing module is configured to enable information associated with the one or more conferencing modalities corresponding to a time of the conference session prior to live to be presented at a desired rate, possibly different from the real-time rate.

20 Claims, 11 Drawing Sheets

(51) Int. Cl.
  *H04N 21/2387*  (2011.01)
  *H04N 21/472*   (2011.01)
  *G06K 9/46*     (2006.01)
  *G10L 25/78*    (2013.01)

(52) U.S. Cl.
  CPC ... *H04N 21/2387* (2013.01); *H04N 21/47202* (2013.01); *G10L 25/78* (2013.01); *H04N 7/155* (2013.01)

(58) Field of Classification Search
  USPC ..... 379/67.1–88.28, 201.01, 202.01–207.01; 709/201–207, 217–248; 348/14.01–14.16; 370/259–271
  See application file for complete search history.

(56) References Cited

U.S. PATENT DOCUMENTS

| | | | | |
|---|---|---|---|---|
| 2007/0133524 A1* | 6/2007 | Kwon | ............... | H04L 29/06027 370/356 |
| 2008/0205444 A1* | 8/2008 | Campbell | ........... | H04L 12/1831 370/469 |
| 2009/0287989 A1* | 11/2009 | Chakra | ............... | G06F 16/9535 715/205 |
| 2010/0070860 A1* | 3/2010 | Alkov | .................... | G06F 16/70 715/716 |
| 2010/0313118 A1* | 12/2010 | Acquaviva | ............ | G06F 16/367 715/254 |

\* cited by examiner

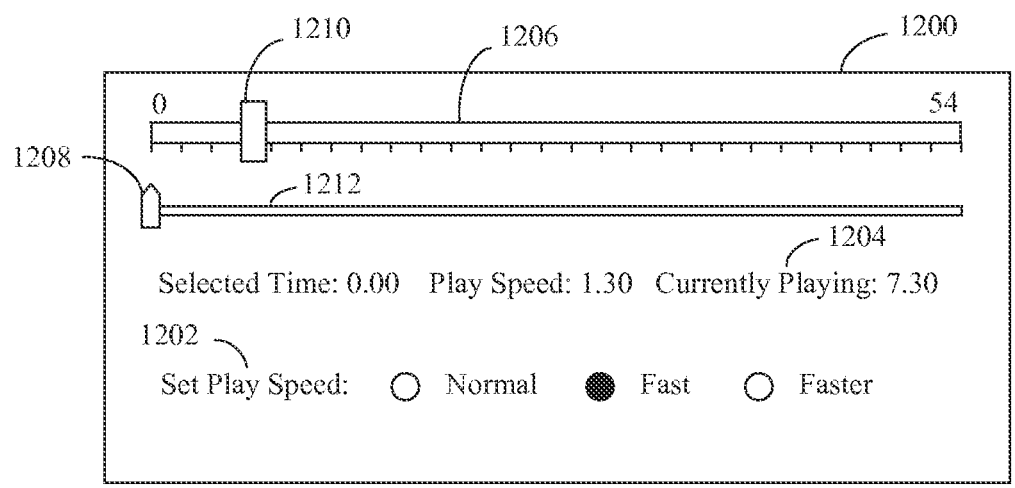
FIG. 12
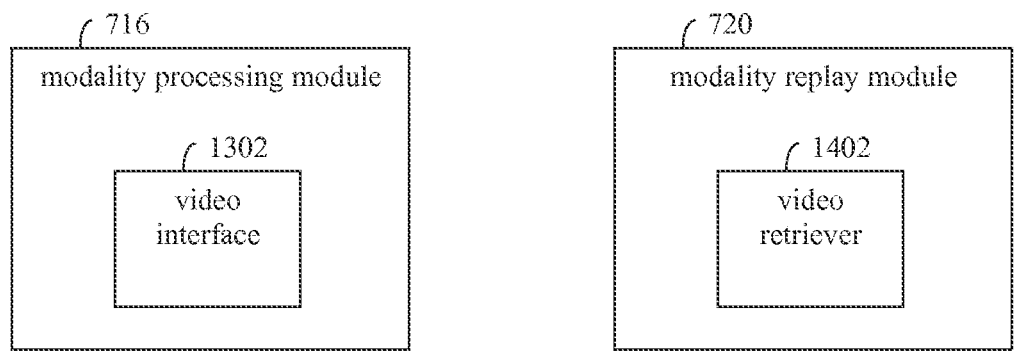
FIG. 13
FIG. 14

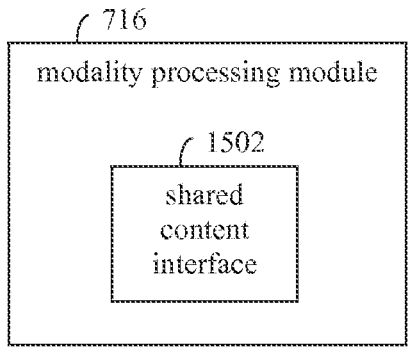 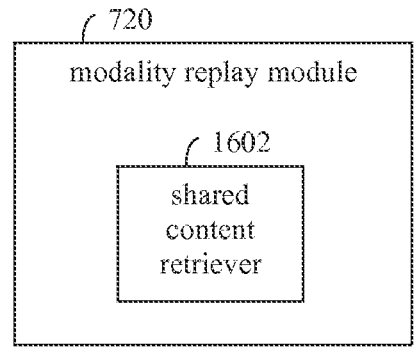
FIG. 15  FIG. 16
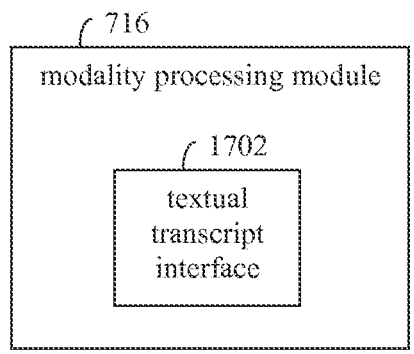 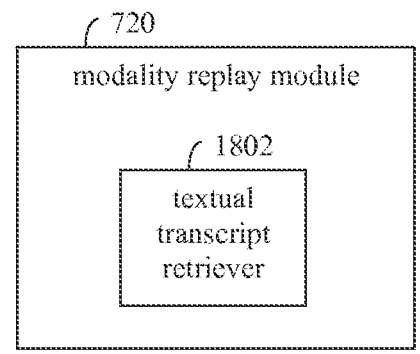
FIG. 17  FIG. 18

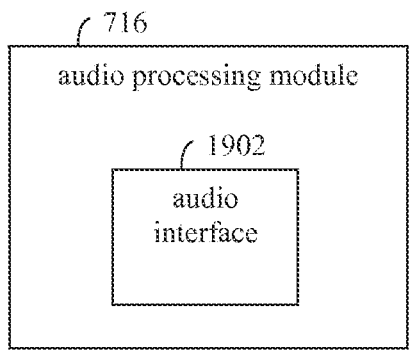
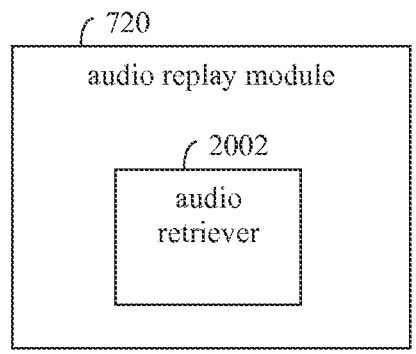
FIG. 19
FIG. 20
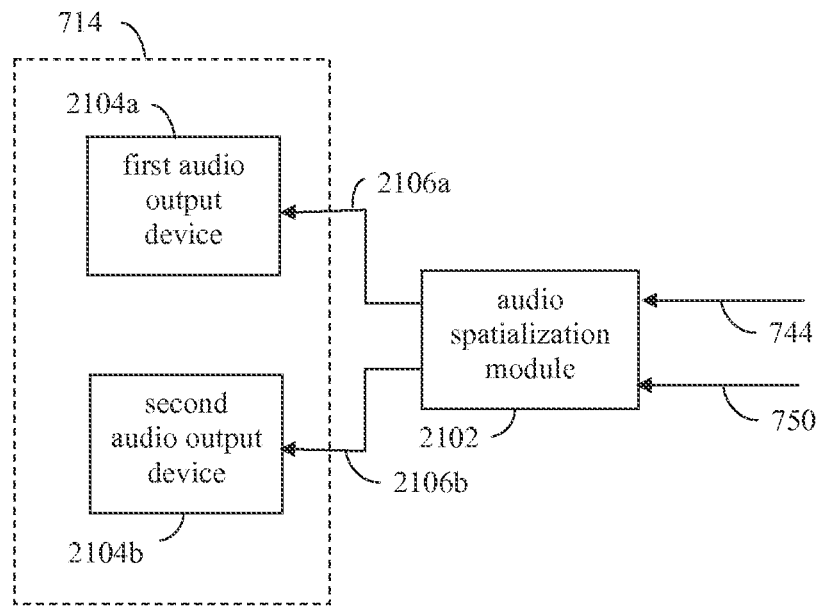
FIG. 21
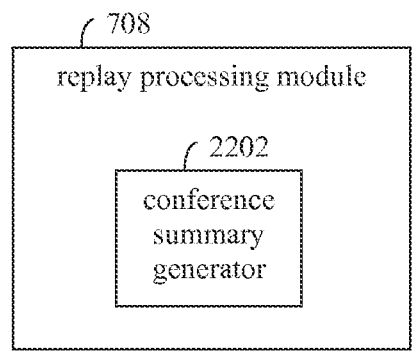
FIG. 22

ACCELERATED INSTANT REPLAY FOR CO-PRESENT AND DISTRIBUTED MEETINGS

CROSS-REFERENCE TO RELATED APPLICATIONS

This application is a continuation application of U.S. patent application Ser. No. 14/327,421, titled "Accelerated Instant Replay for Co-Present and Distributed Meetings," filed on Jul. 9, 2014, now allowed, which is a continuation application of U.S. patent application Ser. No. 12/771,429, titled "Accelerated Instant Replay for Co-Present and Distributed Meetings," filed on Apr. 30, 2010, now U.S. Pat. No. 8,797,380, which are both incorporated by reference herein in their entirety.

BACKGROUND

When people attend meetings or conferences (e.g., business meetings, lectures, events, etc.) they often miss important parts of the discussion because they arrived late, they had to step out of the room, or they became distracted. As a result, such persons generally would like to catch up on what they missed from the meeting. They may ask other meeting participants to update them on what they missed, but such an approach may disrupt the flow of the meeting.

Different types of conferencing techniques exist for enabling persons located remotely from each other to participate in a meeting. For instance, a teleconference is the live exchange of information in audio form among persons located remotely from each another using devices linked by a telecommunications system. A videoconference is similar to a teleconference, where persons that are located remotely from each other are enabled to exchange information in not only audio but also video form. Telepresence is still another technology that enables remotely located persons to interact with each other, such as being enabled to perform videoconferencing with application sharing. Such conferencing techniques for distributed meetings may also suffer from the deficiencies mentioned above for face-to-face meetings, where persons may miss a portion of a conference, and thus would like to catch up on what they missed. Moreover, such persons may want to be able to catch up on what they missed while the conference is still being conducted, so that they can participate in later portions of the conference. Such a situation is very different from a digital video recording scenario where it does not matter if the recorded content is watched live (e.g., watching a broadcast television program as it is received) or in recorded form (e.g., recording the broadcast television program and watching it later). Reviewing portions of a conference while it is still live is a different and much more difficult problem than watching recorded television programs.

Research has been performed on developing techniques for meeting capture and replay. According to the majority of such techniques, however, replay is enabled to be performed after the meeting is over. Another existing meeting capture and replay technique enables faster audio replay. The audio portion of a conference is recorded, analyzed, less important segments of audio are dropped, and the remaining audio is played back to enable persons to hear earlier portions of the conference. Removing unnecessary segments from audio has the effect of speeding up playback causing the replay to catch up with the live conference. However, as described above, modern conferences may have more modalities than just audio, such as video, text and shared data. Eliminating unimportant parts for video and shared data modalities is not trivial and prone to errors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for recording and replaying aspects of live meetings/conferences. Aspects of a conference are recorded, and during the meeting, users are enabled to "replay" the recorded information so that they can hear and/or see portions of the meeting that they missed and/or that they want to hear/see again. Furthermore, when replaying a past portion of a conference, the user may simultaneously be attending the conference in a live fashion. As such, the user is enabled to review past portions of the conference while participating in the live conference.

For instance, in one implementation, a conferencing system is provided that includes a user interface generator, a live conference processing module, and a replay processing module. The user interface generator is configured to generate a user interface that includes one or more output panels and a replay control panel. The live conference processing module is configured to receive conferencing data associated with a conference session, to extract information included in the received conferencing data that is associated with one or more or conferencing modalities, and to display the information in the one or more output panels in live form. The replay control panel is configured to enable a user to select a replay mode by interacting with the replay control panel. The replay processing module is configured to enable conference information that corresponds to a time of the conference session prior to live discussion to be presented if a replay mode is selected.

Examples of the conferencing modalities that may be displayed in live form and in replay form include video, audio, shared content, and a textual transcript of the conference.

In one example implementation, a method for performing a conference is provided. Conferencing data associated with a conference session is received. A user interface that includes a replay control panel and an output panel is generated. Information included in the received conferencing data that is associated with one or more displayable conferencing modalities, such as video, text, and/or data, is displayed in the output panel in live form. Audio of an audio conferencing modality may be played in live form that is based on audio data included in the received conferencing data. A user is enabled to interact with the replay control panel to select a replay mode. Information associated with the first conferencing modality that corresponds to a time of the conference session prior to live is enabled to be displayed if a replay mode is selected.

For instance, in one aspect, during the live conference, a textual transcript of the conference session, video associated with participants of the conference session, and/or shared content of the conference session may be displayed in the first output panel in live form. A second replay control panel and a second output panel may be displayed if a replay mode is selected. The user may be enabled to interact with the first and/or second replay control panel to select a replay time.

Text of the textual transcript, video, and/or shared content of the conference session corresponding to the selected replay time may be displayed in the second output panel to the user. Additionally or alternatively, audio of the conference session corresponding to the selected replay time may be played by an audio output device to the user. Each modality that is being replayed to the user, including video, text, shared content, and/or audio, may be replayed at a normal rate, an accelerated rate, or a reduced rate of playback.

Computer program products are also described herein that enable live conferencing, as well as the pausing of a live conference and/or the replaying of recorded information of the live conference, even while the conference is still live.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 12 shows a view of a replay control panel, according to an example embodiment.

FIGS. 13 and 14 show block diagrams of a modality processing module and a modality replay module, respectively, according to example video modality embodiments.

FIGS. 15 and 16 show block diagrams of a modality processing module and a modality replay module, respectively, according to example shared content modality embodiments.

FIGS. 17 and 18 show block diagrams of a modality processing module and a modality replay module, respectively, according to example textual transcript modality embodiments.

FIGS. 19 and 20 show block diagrams of an audio processing module and an audio replay module, respectively, according to example embodiments.

FIG. 21 shows a block diagram of a portion of a conference-enabled device configured for audio spatialization, according to an example embodiment.

FIG. 22 shows a block diagram of a replay processing module that includes a conference summary generator, according to an example embodiment.

Figure 1:
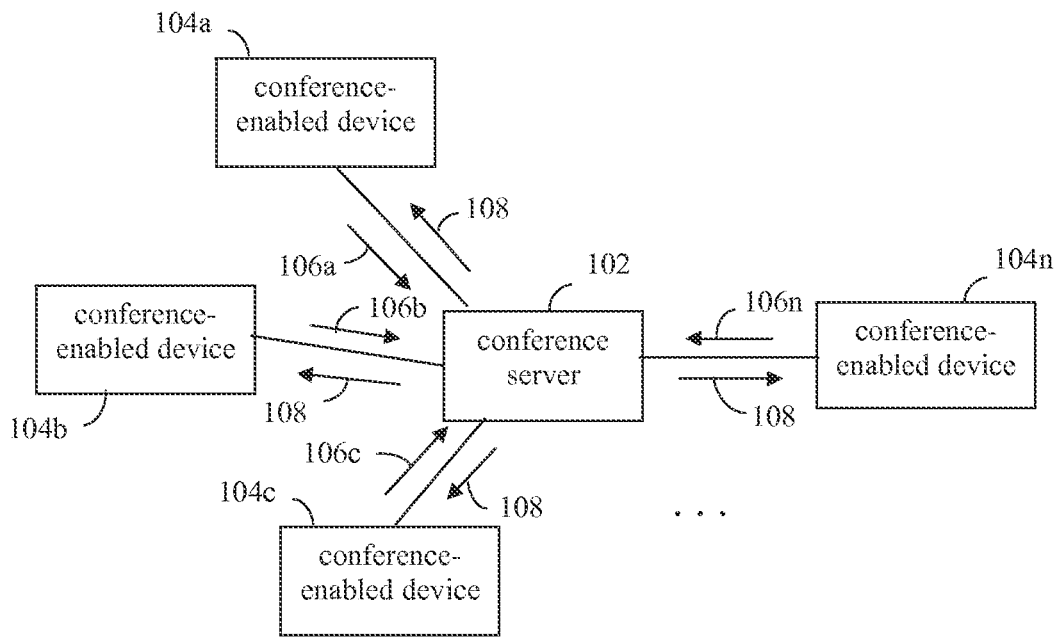
FIG. 1 shows a block diagram of an example multi-party conferencing system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Embodiments

Embodiments of the present invention relate to techniques for recording and replaying aspects of meetings/conferences in a "live" manner, including videoconferences. Aspects of the meeting are recorded, and during the meeting, users are enabled to "pause" the conference, such that the conference is being recorded but is not being played to the user, and/or to "replay" the recorded information so that the user can hear and/or view past portions of the meeting that they missed and/or that they may want to hear/see again. When replaying a past portion of a conference, the user may also be attending the conference in a live fashion (e.g., hearing and/or viewing live aspects of the conference). The prior portions of the meeting may be replayed at a normal rate, a reduced rate, or an accelerated rate. An accelerated replay rate may be used to enable a user to catch-up to the live discussion. Replay is enabled for any one or more aspects or "modalities" of meetings, including one or more of audio, video, shared content, a textual transcript of the meeting, etc. All the selected modalities may be replayed in synchronism.

Any conference modality may be played solely in a live manner, may be played in a live manner and in a replay manner simultaneously, or may be played solely in a replay manner. Any combination of conference modalities may be played live and/or in replay simultaneously. For instance, video presented during a conference may be selected for replay simultaneously with live conference video, or either of the live or replay conference video may be displayed. Similarly, shared content presented during conference may be selected for replay simultaneously with live shared content, or either of the live or replay shared content may be displayed. A textual transcript may be generated (e.g., speech-to-text) for the conference in a live manner, such that users can "read" what was previously said, what is currently being said, etc., during the conference. With regard to audio, both past audio of the conference and present audio of the conference may be listened to by a user simultaneously, or one of the past or present audio may be muted so that the user can listen to one or the other. Users may be enabled to scroll or otherwise traverse through the recorded audio, video, shared content, and/or textual transcript during the conference (e.g., using a scrollbar to move backwards and forwards, etc.) and/or may be enabled in further ways to replay a conference.

In embodiments, areas of interest of a conference may be indicated during the conference in a manual and/or automatic manner. For instance, users may be enabled to indicate times during a recorded conference timeline that they desire to return to later for review (e.g., may set a "checkpoint" flag in the textual transcript or elsewhere). Furthermore, various user interface cues may be automatically provided to users, and indicated in the conference recording, to be displayed to the users to enable the users to review corresponding areas of interest. Examples of such areas of interest are speech activities, such as speech by particular participants, speaker change events, and content change events, such as changes in presentation slides or other shared content, changes in displayed video, etc. Still further, aspects of the conference may be summarized automatically. For example, the speech-to-text transcript may be analyzed to generate keyword clouds, short summaries, and/or other textual descriptions of the conference. The checkpoints and other indicated areas of interest, keyword clouds, short summaries, etc., may be used to enable users to more easily locate and review specific parts of the conference. For example, users may be enabled to select the indicated areas of interest, keywords of a keyword cloud, words in a generated summary, etc., to automatically be transferred to portions of the conference corresponding to the selection for viewing/listening.

Example embodiments are described in detail in the following sections/subsections. For instance, example conferencing systems are described in the next section, followed by descriptions of example conferencing devices, user interfaces, and conferencing replay configurations that enable replay of conference content during live conferences.

A. Example Conferencing Systems

Embodiments of the present invention may be implemented in conferencing systems that enable multiple parties to share information in a live manner, including one or more of audio (e.g., participant speech), video (e.g., participant images), shared content (e.g., shared desktop), a transcript of the meeting, etc. Various types of conferencing systems may be used. For instance, FIG. 1 shows a block diagram of an example multi-party conferencing system 100. System 100 is an example of a conferencing system that uses a centralized conference server (e.g., a Multipoint Control Unit (MCU)) to collect conference content from each of the conference participants, and to combine and redistribute the combined content back to the conference participants. Embodiments may alternatively be implemented in non-centralized conferencing systems (e.g., where each conference participant communicates directly with each other conference participant, such as in a H.323 standard "decentralized multipoint" configuration), and in other types of conferencing systems.

System 100 is described as follows for purposes of illustration as an example conferencing system, and is not intended to be limiting. As shown in FIG. 1, system 100 includes a conference server 102 and a plurality of conference-enabled devices 104a-104n (e.g., "participant devices"). One or more users may be present at each of conference-enabled devices 104a-104n, and may use the corresponding conference-enabled device 104 to participate in a multi-party conference. For example, the users may speak/talk into one or more microphones at each conference-enabled device 104 to share audio information in the conference call. Images of the users may be captured by cameras at each conference-enabled device 104 to share image/video information in the conference call. Furthermore, data/content may be provided by users at each conference-enabled device 104 to share content information in the conference call. For instance, one or more users may be enabled to share their device desktop with the other users participating in the conference, which may include a document open in a word processing or presentation application, a web page open in a browser, and/or any other suitable content.

As shown in FIG. 1, each of conference-enabled devices 104a-104n may generate one of data streams 106a-106n (e.g., streams of data packets). Each data stream 106 includes audio, video, and/or other data generated based on one or more of sound (e.g., voice from talkers, etc.), images, shared content, etc., captured at the corresponding conference-enabled device 104. Data streams 106a-106n may each include multiple separate data streams corresponding to any audio data, image data, or other data that may be provided by the corresponding device 104. Each of data streams 106a-106n is received at conference server 102. At any particular moment, conference server 102 may be configured to select all or a portion of data streams 106a-106n to be transmitted back to each of conference-enabled devices 104a-104n as the shared conference audio. For example, the data streams that are selected by conference server 102 to be shared may be all of the data streams, or may be just those data streams that are provided from active participants.

Note that conference server 102 may transmit the same shared data stream 108 to all of conference-enabled devices 104a-104n, or may generate a shared data stream specific to some of conference-enabled device 104a-104n. For instance, conference server 102 may not include a conference-enabled device's own audio, video, or other data in the shared data stream transmitted to the conference-enabled device.

B. Example Conferencing Devices

Figure 2:
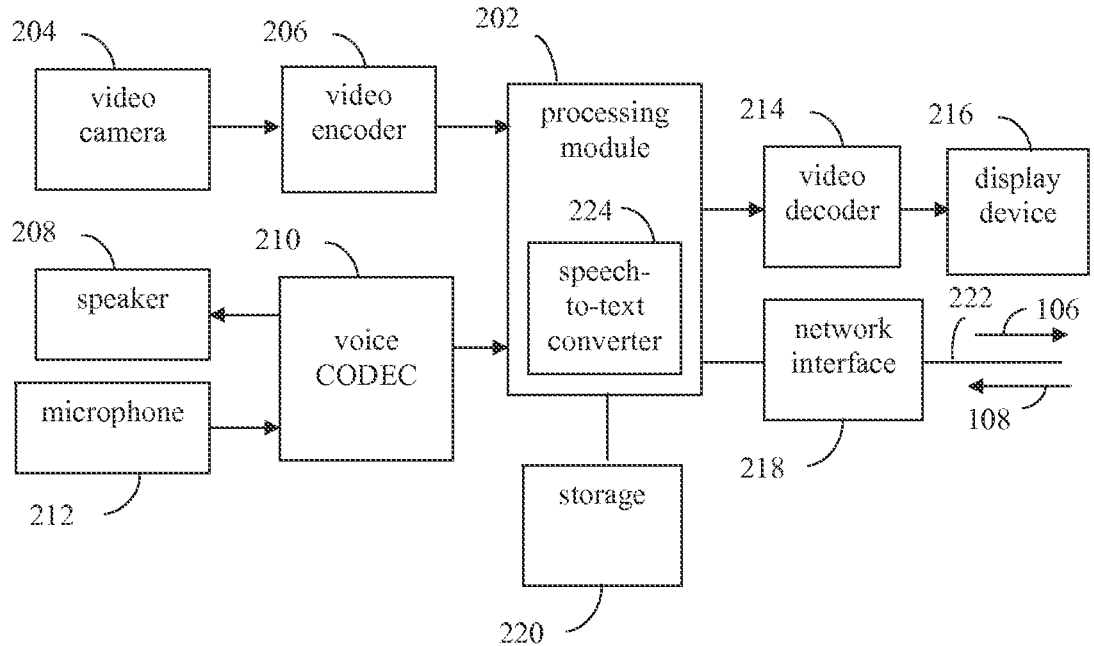
FIG. 2 shows block diagram of an example conference-enabled device.

Embodiments may be implemented in devices that enable parties to participate in multi-party conferences in a live manner. For example, such conferencing-enabled devices may enable users to provide to other conference participants, and to receive from the other conference participants, one or more of audio, video, shared content, a meeting transcript, etc. Various types of conferencing devices may be used. For instance, FIG. 2 shows a block diagram of a conference-enabled device 200 that is an example of a conference-enabled device 104 (FIG. 1), according to an embodiment. Conference-enabled device 200 is shown in FIG. 2 as configured for audio, video, and data conferencing. In embodiments, conference-enabled device 200 may be configured for any one or more of audio, video, and/or data conferencing, and/or alternative types of conferencing (e.g., instant messaging, text sharing, etc.). Examples of conference-enabled device 200 include a desktop computer (e.g., a personal computer, etc.), a mobile computing device (e.g., a smart phone, a personal digital assistant (PDA), a laptop computer, a notebook computer, a tablet computer (e.g., an Apple iPad™, an HP Slate™ etc.), a netbook, etc.), a conference phone (e.g., a videophone), a conference-enabled television, or other type of conference-enabled device.

As shown in FIG. 2, conference-enabled device 200 includes a processing module 202, a video camera 204, a video encoder 206, a speaker 208, a voice CODEC 210, a microphone 212, a video decoder 214, a display device 216, a network interface 218, and storage 220. These components of device 200 are further described as follows.

Processing module 202 is coupled to each of video encoder 206, voice CODEC 210, video decoder 214, network interface 218, and storage 220. Processing module 202 may be individually coupled to these components, or one or more of these components may be connected to processing module 202 in a common bus structure. Processing module 202 may be implemented in various ways, including in the form of one or more processors (e.g., a CPU) and/or logic components. Processing module 202 may include or be configured to execute program code that enables functionality described herein for enabling device 200 to participate in a conference.

Video camera 204 and video encoder 206 may be present in video conferencing applications. When present, video camera 204 captures video images, as configured by one or more users of device 200. For example, video camera 204 may capture still or video images of the one or more users at device 200 participating in a conference, may capture video images of a white board or other board, may capture video images of a lecture, and/or may capture any other video of interest to a conference. Video camera 204 may be a webcam or other type of video camera that can capture still photographs, video data, and which can be coupled into device 200. Video camera 204 generates a video stream that is received by video encoder 206, and that includes one or more images and/or video. The video stream may include digital data or analog information that is converted to digital form by an analog-to-digital (A/D) converter of video encoder 206. Video encoder 206 encodes (e.g., compresses) the video data of the received video stream. Video encoder 206 generates an encoded video data stream that is received by processing module 202.

Microphone 212 and voice CODEC 210 may be present in audio conferencing applications. When present, microphone 212 captures audio, as configured by one or more users of device 200. For example, microphone 212 may capture voice and/or other sounds generated by the one or more users participating in the conference through device 200. Microphone 212 may be any type of microphone. Microphone 212 generates an audio stream that is received by voice CODEC 210. The audio stream may include digital data, or analog information that is converted to digital form by an analog-to-digital (A/D) converter of voice CODEC 210. Voice CODEC 210 encodes (e.g., compresses) the audio data of the received audio stream. Voice CODEC 210 generates an encoded audio data stream that is received by processing module 202. Furthermore, device 200 (e.g., processing module 202) may include a speech-to-text converter 224 configured to convert speech in the audio stream to text.

Processing module 202 may further enable users of device 200 to provide shared content. For example, a user of device 200 may be enabled to operate a program, such as a word processing application, a presentation application, or any other application, and/or may be enabled to interact with a web page using a browser, etc., which may be displayed to the user at display device 216. Interaction of the user with the content may be captured in the form of shared data that is generated and/or received by processing module 202.

Processing module 202 receives the encoded video, audio, and/or shared data streams. Processing module 202 may buffer the video data, audio data, and/or shared data in storage 220. Storage 220 may include any suitable type of storage, including one or more hard disc drives, optical disc drives, memory devices (e.g., FLASH memory devices), etc. Processing module 202 streams the data to network interface 218.

Network interface 218 interfaces device 200 with a communications network 222 (e.g., shown coupling devices 104a-104n and server 102 in FIG. 1). For example, in an embodiment, network interface 218 is a network interface card (NIC) for interfacing with an Ethernet network. In embodiments, network interface 218 may be configured to enable a wired and/or wireless connection with communications network 222. For example, network interface 218 may enable a wireless local area network (WLAN) link (including an IEEE 802.11 WLAN standard link), and/or other type of wireless communication link. Communications network 222 may be a local area network (LAN), a wide area network (WAN), the Internet, or other network. Network interface 218 may alternatively enable a phone line link (e.g., network 222 may include a phone line) or other type of communications link, depending on the particular application.

Network interface 218 generates a stream of data packets (or other form of data) that includes the video, audio, text, and/or shared data, and transmits the data packet stream to conference server 102 (or directly to each other conference-enabled device, depending on the conferencing configuration) over network 222 as data stream 106. Furthermore, network interface 218 receives a stream of data packets from conference server 102 (or from each other conference-enabled device) over network 222 that includes the audio, video, text, and/or shared data from other devices of the conference. Network interface 218 provides the received data stream to processing module 202.

Processing module 202 may extract the audio, video, and/or shared data from the received data stream, and optionally processes the extracted data. In an embodiment, processing module 202 includes a digital signal processor (DSP). When present, the DSP may apply special effects to the received audio data (e.g., an equalization function), video data (e.g., background extraction and/or substitution, etc.), and/or shared data (e.g., resolving conflicting commands, merging concurrent commands, etc.). Processing module 202 may buffer the received data in storage 220. Processing module 202 provides the video data to video decoder 214, and the audio data to voice CODEC 210. Any received text and/or shared data may be displayed by processing module 202 at display device 216.

Video decoder 214 receives and decodes (e.g., decompresses) the video data (and optionally the received shared data). Video decoder 214 generates a video data stream (analog or digital), which is received by display device 216. Display device 216 displays images corresponding to the received video data. For example, display device 216 may display multiple panels of video, each panel corresponding to a different participant of the conference. Display device 216 may include any type of display mechanism, including a cathode ray tube (CRT) monitor, a flat panel monitor (e.g., an LCD (liquid crystal display) panel), or other display mechanism.

Voice CODEC 210 performs bit stream decoding of the received audio data (if needed) and converts the decoded data to an analog signal. Speaker 208 receives the analog signal, and outputs corresponding sound (e.g., voice). For example, speaker 208 may output sound that is a combination of the voices of the participants of the conference. The combination of voices may or may not include the voice(s) of the user(s) of device 200, depending on the particular implementation.

Video encoder 206, voice CODEC 210, and video decoder 214 may be implemented in hardware, software, firmware, and/or any combination thereof. Video encoder 206, voice CODEC 210, and video decoder 214 may be configured to perform encoding and/or decoding of data according to proprietary and/or conventional audio and/or video data compression/decompression/encoding/decoding standards, such as those mentioned elsewhere herein or otherwise known. In an embodiment, video encoder 206 and video decoder 214 may be combined in a video CODEC.

Thus, in embodiments, device 200 may be used to capture video, audio, audio text, and/or other data to contribute to a conference, and to receive and display video, text, and/or shared content, and/or to receive and play audio related to the conference. Device 200 is described herein for purposes of illustration, and is not intended to be limiting. Embodiments may be implemented in further types of conferencing-enabled devices.

C. Distributed Conferencing User Interfaces

Figure 3:
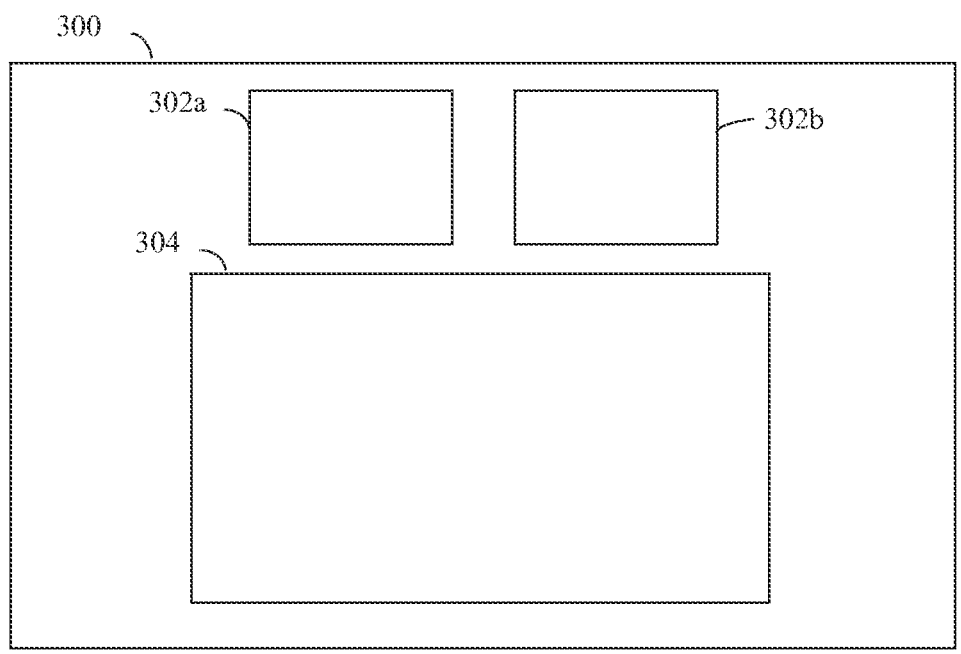
FIG. 3 shows a block diagram of an example user interface window that may be displayed by a conference-enabled device to enable a user to participate in a conference.

Conferencing applications that enable remotely located participants to interact in a conference may be configured in various ways, and may provide various types of interfaces for the conference participants to interact with each other. For instance, FIG. 3 shows a block diagram of an example user interface window 300 that may be generated (e.g., by a conferencing application) for display by a conference-enabled device. Window 300 displays features of a live conference as the conference is conducted between conference participants. Window 300 may be displayed concurrently with audio of the conference being played by an audio output device (e.g., a loudspeaker) associated with the conference-enabled device.

In the example of FIG. 3, window 300 includes first and second video display regions 302a and 302b and a shared content display region 304. Video images of the remote conference participants transmitted from corresponding remote conference-enabled devices are displayed in first and second video display regions 302a and 302b, respectively. Shared content display region 304 displays content being shared by a conference participant with the other conference participants. Any user participating in the conference may be enabled to take control of the content being shared in shared content display region 304. Although not shown in FIG. 3, window 300 may provide further conference-related features, including displaying a list of conference participants, a status of each participant, a control interface for entering and/or exiting the conference, etc. Window 300 does not enable a user to replay portions of a live conference, however.

Figure 4:
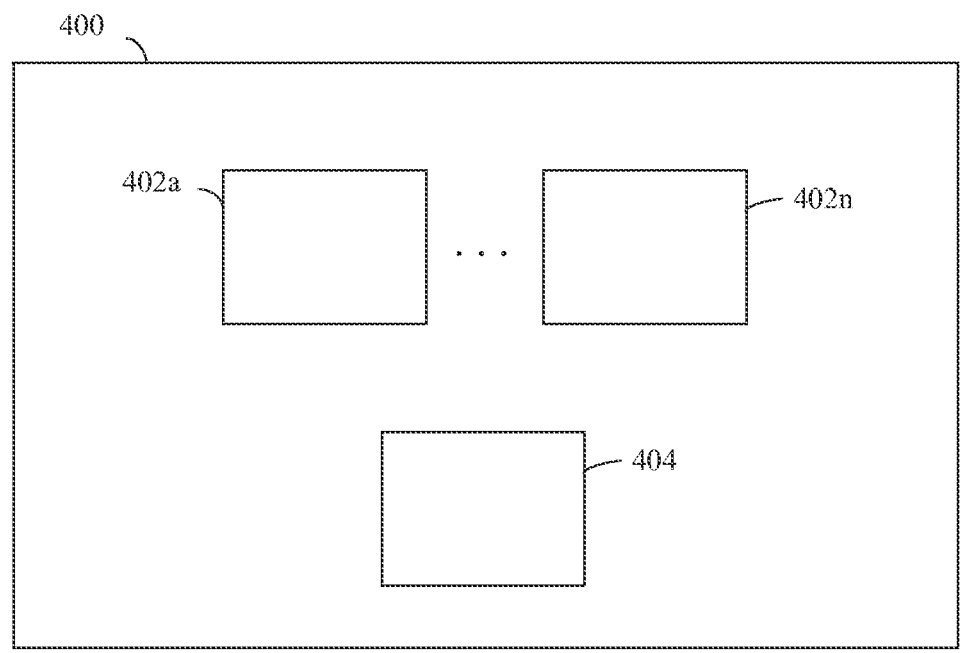
FIG. 4 shows a block diagram of a user interface window that may be displayed by a conference-enabled device to enable user participation in a conference, and to enable conference replay, according to an example embodiment.

FIG. 4 shows a block diagram of an example user interface window 400 that may be generated for display by a conference-enabled device, according to an embodiment. Window 400 displays features of a live conference as the conference is conducted between conference participants. Window 400 may be displayed concurrently with audio of the conference being played by an audio output device (e.g., a loudspeaker) associated with the conference-enabled device. Furthermore, window 400 is configured to enable a user to replay portions of a conference when the conference is live, according to embodiments.

As shown in FIG. 4, window 400 includes a plurality of modality display regions 402a-402n and a replay control interface region 404. Modality display regions 402a-402n each display aspects of a corresponding "modality" supported by the live conference associated with window 400. Examples of modalities include a video modality, a shared content modality, and a textual transcript modality. Further or alternative modalities may be supported by window 400. Any number of one or more modality display regions 402 may be present in window 400 and each displays aspects of a corresponding modality.

Replay control interface region 404 is a user interface that enables replay of a portion (or entirety) of a conference to a user while the conference is live. For instance, replay control interface region 404 may enable the user to start playing the conference from the beginning or from a particular point of time during the conference. Furthermore, replay control interface region 404 may enable the user to replay the conference at a normal (e.g., recorded) rate, a slower rate, or a faster rate. Any combination of modalities (e.g., audio, video, shared content, textual transcript, etc.) may be replayed simultaneously, and synchronized, at the normal, slower, or faster rate. Still further, replay control interface region 404 may enable the user to select which of the modalities of the conference are to be replayed.

Replay control interface region 404 may include any number and combination of user interface elements to enable replay of a live conference. Examples of such user interface elements include graphical icons, visual indicators, menus, radio buttons, check boxes, sliders, etc. In embodiments, by interacting with replay control interface region 404, one or more windows may be invoked and displayed that display one or more modalities of the conference in replay form, and that may provide further replay control user interface elements.

Modality display regions 402a-402n and replay control interface region 404 may have any form in window 400, including having the form of "panels," "widgets," etc. Furthermore, in embodiments, modality display regions 402a-402n and replay control interface region 404 may be included in a single window (e.g., window 400) or may be included in multiple windows provided by a display device.

D. Example Conference Replay Configurations

Figure 5:
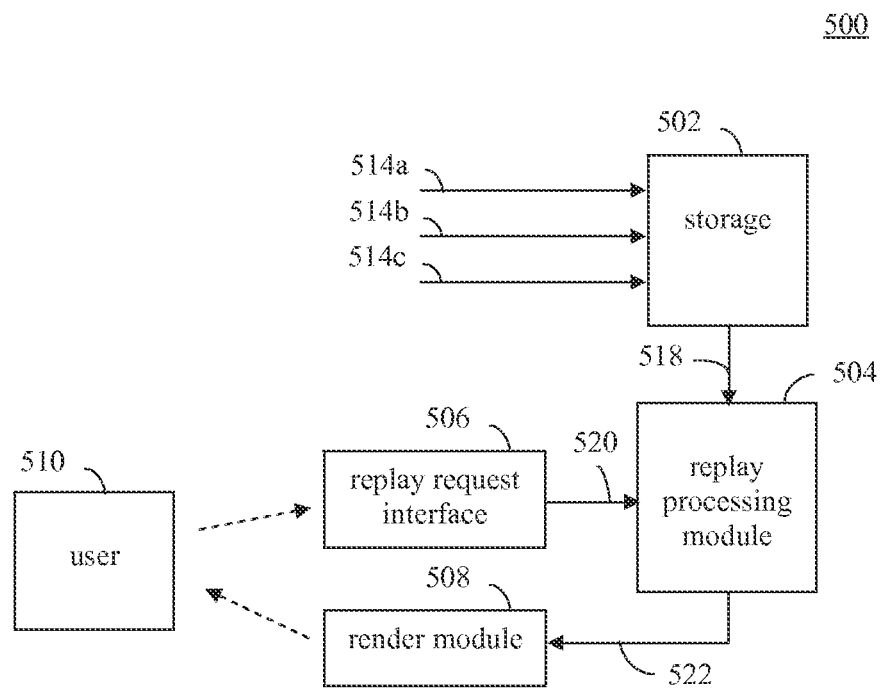
FIG. 5 shows a block diagram of a conference replay system, according to an example embodiment.

Conference replay functionality may be implemented in conference servers and/or in conference-enabled participant devices in various ways. For instance, FIG. 5 shows a block diagram of a conference replay system 500, according to an example embodiment. As shown in FIG. 5, conference replay system 500 includes storage 502, a replay processing module 504, a replay request interface 506, and a render module 508. Portions of system 500 may be implemented in a conference server or in participating conference-enabled devices, depending on the particular embodiment. System 500 is described as follows.

As shown in FIG. 5, storage 502 receives an audio data stream 514a, a video data stream 514b, and a shared content data stream 514c (and may receive transcript data). In embodiments, storage 502 may receive any one or more of audio data stream 514a, video data stream 514b, and shared content data stream 514c, depending on the particular types of data provided in the particular conference. Storage 502 may be located in a conference server (e.g., conference server 102 of FIG. 1) or in a conference-enabled device. When located in a conference server, storage 502 may receive audio data stream 514a, video data stream 514b, and/or shared content data stream 514c from each participating conference-enabled device. When located in a conference-enabled device, storage 502 may receive audio data stream 514a, video data stream 514b, and/or shared content data stream 514c containing combined data output from the conference server (when present), or may receive an audio data stream 514a, a video data stream 514b, and/or a shared content data stream 514c from each participating conference-enabled device. Storage 502 stores the data received in each of audio data stream 514a, video data stream 514b, and shared content data stream 514c.

A user 510 is shown in FIG. 5 that is a user of a conference-enabled device participating in the conference. User 510 may decide to replay a portion of the conference that user 510 may have missed or may want to re-play. In such case, user 510 may interact with replay request interface 506 to request that a portion of the conference be replayed. For instance, user 510 may indicate a start time for replay of the conference. As shown in FIG. 5, replay request interface 506 generates a replay request 520. Replay request 520 indicates the request by user 510 for replay of a portion of the conference. Replay request 520 may indicate a replay mode (e.g., which available content of the conference is to be replayed), a time of the conference at which replay is to begin, and/or other information.

Replay processing module 504 may be located in a conference server (e.g., conference server 102 of FIG. 1) or in a conference-enabled device. Replay processing module 504 receives replay request 520. Replay processing module 504 determines the point of time at which replay of the conference is to begin based on replay request 520, and retrieves corresponding replay conferencing data 518 from storage 502. For example, replay conferencing data 518 may be streamed from storage 502 to replay processing module 504 that starts at the determined begin time and continues to be streamed (e.g., until user 510 indicates that replay is complete, or until live conference time is reached). Replay conferencing data 518 may include one or more conference modalities, including audio data, video data, shared content data, textual transcript data, etc. Replay processing module 504 may process replay conferencing data 518, and generates processed replay conferencing data 522. For example, replay processing module 504 may increase a rate at which replay conferencing data 518 (e.g., may remove video frames, etc.) is played, may decrease a rate at which replay conferencing data 518 may be played, or may otherwise process replay conferencing data 518 to generate processed replay conferencing data 518.

Render module 508 receives processed replay conferencing data 518, and displays/plays processed replay conferencing data 518. User 510 receives (e.g., sees and/or hears) the displayed/played information. For example, render module 508 may include a graphical rendering module to render video, shared content, a textual transcript, and/or other graphical data of processed replay conferencing data 518 to be displayed to user 510 by a display device. Render module 508 may alternatively or additionally include an audio rendering module to render audio of processed replay conferencing data 518 to be broadcast to user 510 by an audio output device.

Storage 502 may include one or more of any type of storage mechanism (e.g., storage 220 of FIG. 2), including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Replay processing module 504 may be implemented in any suitable manner, such as being implemented in processing module 202 of FIG. 2 (e.g., when included in a conferencing-enabled device). Replay request interface 506 and render module 508 may each be implemented in any manner.

E. Further Example Conference Replay Configurations

Figure 6:
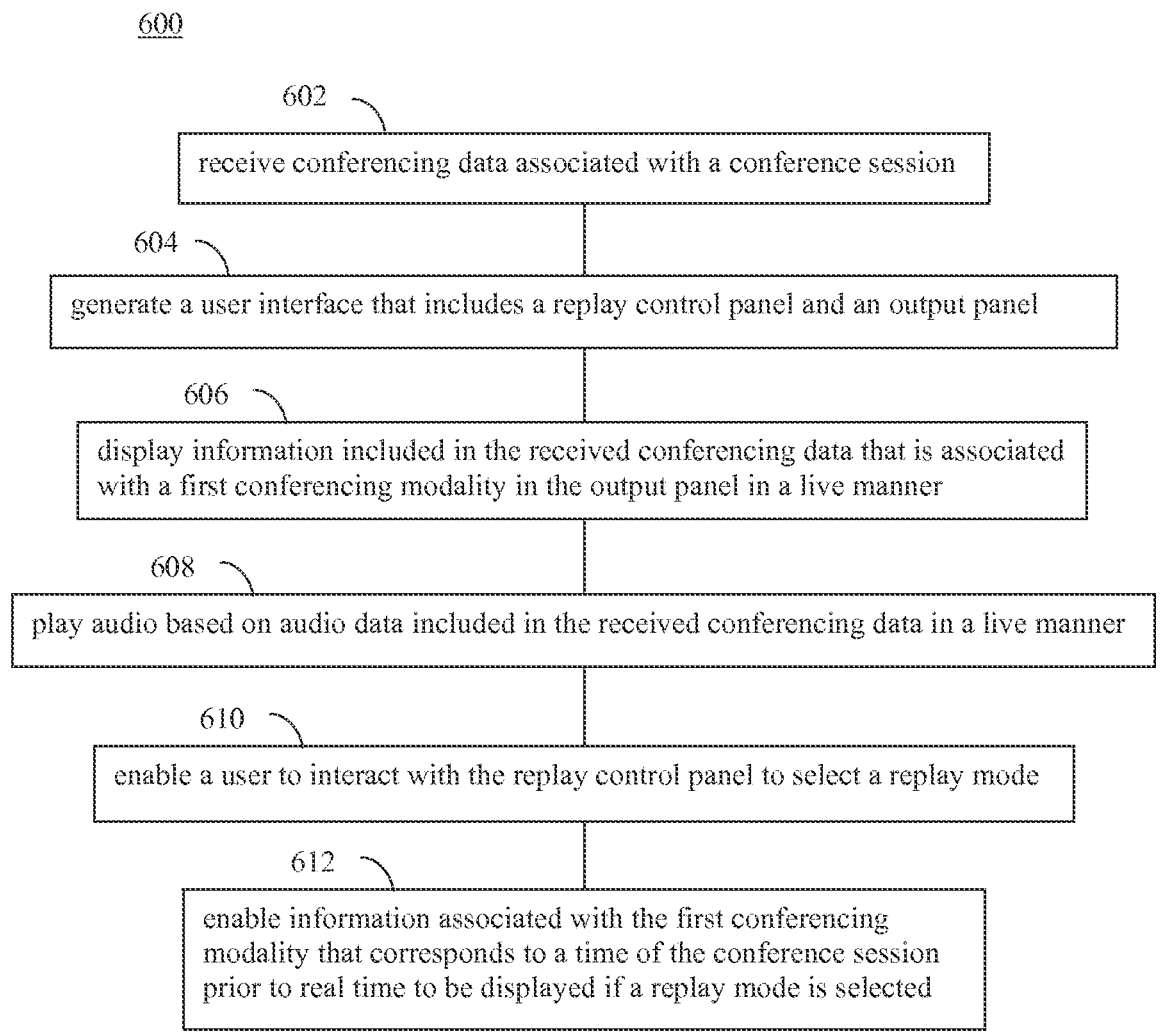
FIG. 6 shows a flowchart providing example steps for multi-party conferencing with optional conference replay, according to an example embodiment
Figure 7:
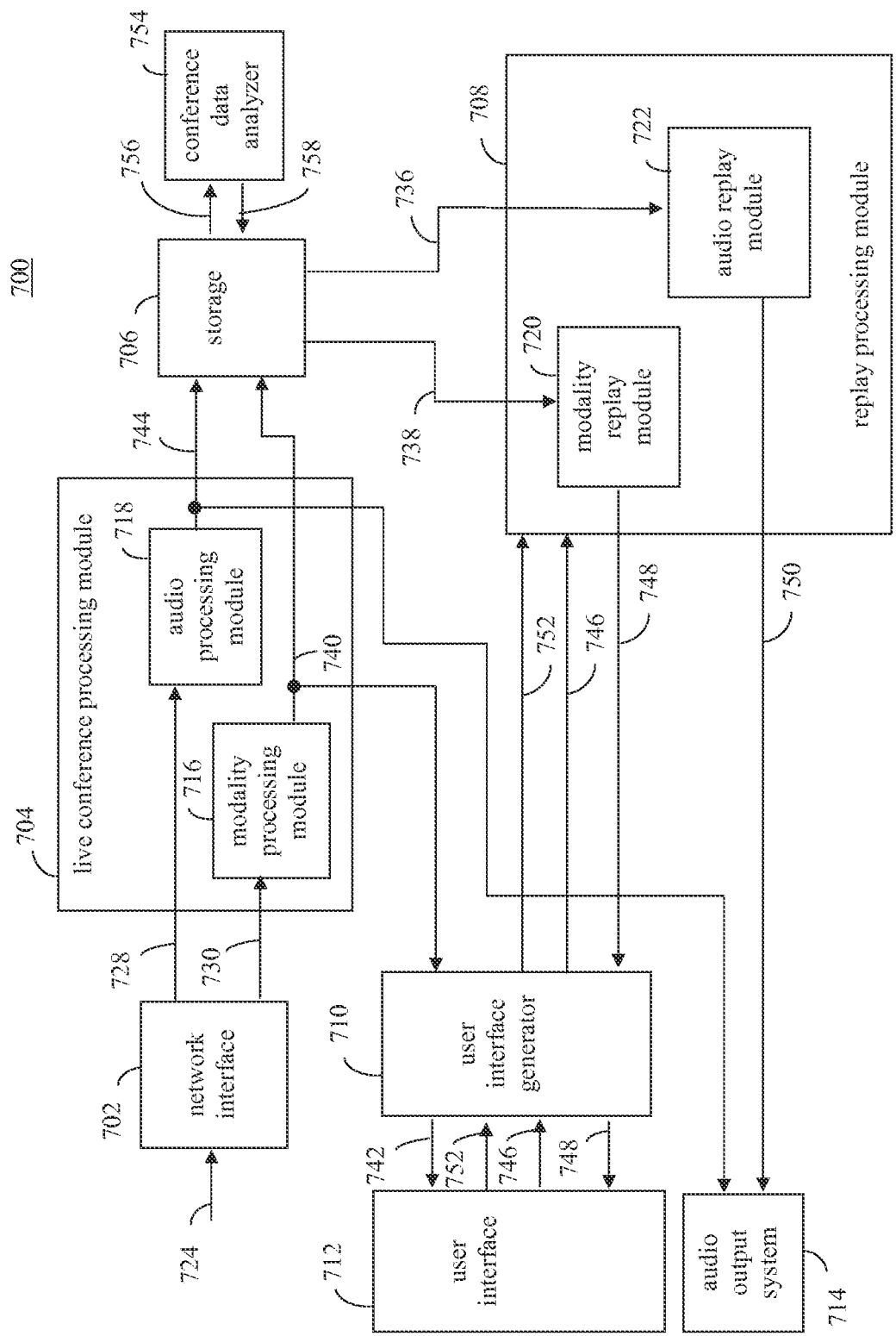
FIG. 7 shows a block diagram of a conference-enabled device, according to an example embodiment.

System 500 of FIG. 5 may operate in various ways, and may be configured in various ways, to enable replay during live conferences. For instance, FIG. 6 shows a flowchart 600 providing example steps for multi-party conferencing with selective replay, according to an example embodiment. FIG. 6 is described with respect to FIG. 7 for illustrative purposes. FIG. 7 shows a block diagram of a conference-enabled device 700, according to an example embodiment. The example of device 700 is shown in FIG. 7 as being configured to process two conferencing modalities, but in embodiments may be modified to process any number of one or more modalities and any combination of modalities, as would be understood to persons skilled in the relevant art(s) from the teachings herein. As shown in FIG. 7, device 700 includes a network interface 702, a live conference processing module 704, storage 706, a replay processing module 708, a user interface generator 710, and a user interface 712. Other structural and operational embodiments will be apparent to persons skilled in the relevant art(s) based on the discussion regarding flowchart 600. Note that the steps shown in FIG. 6 do not necessarily need to be performed in the order shown. Flowchart 600 is described as follows.

Flowchart 600 begins with step 602. In step 602, conferencing data associated with a conference session is received. For instance, as shown in FIG. 7, a conferencing data stream 724 may be received by network interface 702 from a network (e.g., network 222 of FIG. 2). Conferencing data stream 724 may be received from a conference server (if present) or may include data streams received directly from other participating conference devices. Conferencing data stream 724 may include one or more data streams associated with various conference modalities, such as audio data, video data, shared content data, textual transcript data, etc. For instance, in the example of FIG. 7, data associated with a first conferencing modality (e.g., one of video data, shared content data, textual transcript data, etc.) and audio data are included in conferencing data stream 724. In other embodiments, other data modalities may be received in conferencing data stream 724. Network interface 702 may be configured to extract the data from conferencing data stream 724. As shown in FIG. 7, network interface 702 outputs audio data 728 and first modality data 730.

Figure 8:
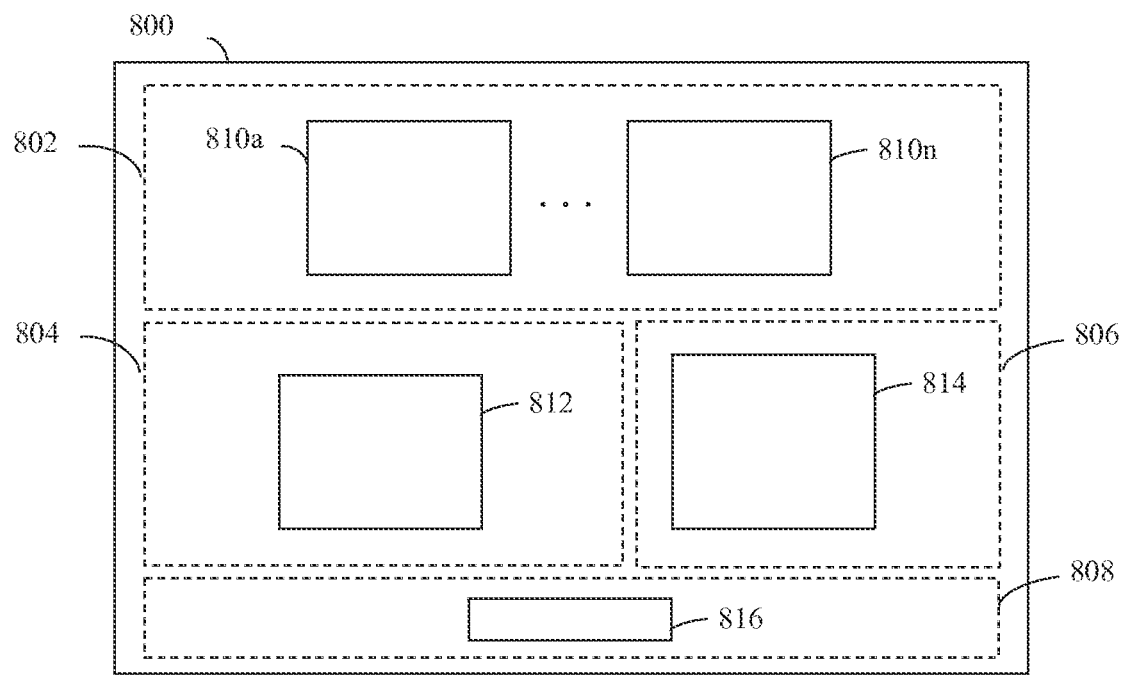
FIG. 8 shows a block diagram of a user interface window configured to enable a user to interact with a conference and to select conference replay, according to an example embodiment.

In step 604, a user interface is generated that includes a replay control panel and an output panel. For example, as shown in FIG. 7, user interface generator 710 may be configured to generate a user interface 712 for device 700. Users may interact with user interface 712 to participate in a conference. The generated user interface 712 may have any form and arrangement, and may support any number of conference modalities. For instance, FIG. 8 shows a block diagram of a user interface window 800 that may be generated by user interface generator 710 for display by device 700 (e.g., by display device 216 of FIG. 2), according to an example embodiment. Window 800 is an example window that may be included in user interface 712. Window 800 displays features of a live conference as the conference is conducted between conference participants. Window 800 may be displayed concurrently with audio of the conference being played by an audio output device associated with device 700 (e.g., audio output system 714).

In the example of FIG. 8, window 800 includes first-third output panels 802, 804, and 806, which are associated with corresponding conference modalities, and a replay control panel 808 that enables conference replay while a conference is live. Panels 802, 804, 806, and 808 are described in terms of graphical "panels" for purposes of illustration, but may have any suitable form (e.g., including or not including boundary lines, etc.). Furthermore, although panel 802 is shown in an upper location, panel 804 is shown in a left side location, panel 806 is shown in a right side location, and panel 808 is shown in a lower location of window 800 in FIG. 8, panels 802, 804, 806, and 808 may be arranged in window 800 in any manner or pattern. Furthermore, panels 802, 804, 806, and 808 may have any relative sizes in window 800.

In the example of FIG. 8, first output panel 802 is a video output panel that displays one or more video images received from other participating conference devices. In the example of FIG. 8, video display regions 810a-810n are included in first output panel 802. Live video feeds transmitted from remote conference devices may be displayed in video display regions 810a-810n. For example, images of the remote conference participants, white boards, etc. may be displayed in video display regions 810a-810n. Any number of video display regions 810 may be present in first output panel 802 corresponding to remote participants.

In the current example, second output panel 804 is a shared content output panel that displays content 812 (e.g., a desktop view, etc.) being shared by a conference participant with the other conference participants. Any user participating in the conference may be enabled to take control of shared content 812 in second output panel 804.

Furthermore, in the current example, third output panel 806 is a transcript panel that displays a textual transcript 814 of the current live conference. For example, textual transcript 814 may have the form of a text box where text (e.g., generated from speech) of the conference is displayed. Text of textual transcript 814 may automatically scroll so that the most recent text is displayed in third output panel 806. To generate the text, a speech-to-text conversion for the whole conference may be performed in device 700 (e.g., by speech-to-text converter 224 of FIG. 2) or in a conference server, or may be performed at each participating conference device for the speech received locally at the microphone of the corresponding participating conference device. Thus, device 700 may perform speech-to-text conversion for speech received by a microphone of device 700. When transcription of locally received speech is performed at each participating conference device, the transcribed text may be combined (e.g., interleaved in order) in the conference server (when present) or in device 700 to form textual transcription 814. Thus, device 700 may interleave transcribed text received from each participant device with locally transcribed text. As such, a user of device 700 (and users of other participating conference devices) can view an interleaved transcription of both the local and remote participants that resembles a conversation flow similar to an instant messaging conversation. Each participant's text may be preceded with the participant's user name, may be shown in a different color than the text of the other participants, and/or may be highlighted in another fashion to distinguish the participants (e.g., based on their source conference devices, etc.).

Although not shown in FIG. 8, window 800 may provide further conference-related features, including displaying a list of conference participants, a status of each participant, a control interface for entering and/or exiting the conference, etc. Furthermore, fewer, additional, and/or alternative panels may be present in window 800 corresponding to fewer, additional, and/or alternative conference modalities, depending on the particular embodiment.

Referring back to FIG. 6, in step 606, information included in the received conferencing data that is associated with a first conferencing modality is displayed in the output panel in a live manner. For example, referring to FIG. 7, live conferencing processing module 704 is configured to process data of one or more conference modalities for live presentation during a conference. In the example of FIG. 7, live conference processing module 704 includes a modality processing module 716 and an audio processing module 718. As such, live conference processing module 704 is configured to enable audio and another conference modality (e.g., video, shared content, a textual transcript, etc.) to be provided to a user of device 700 during a conference. In alternative embodiments, fewer, additional, and/or alternative modules may be present in live conference processing module 704 corresponding to fewer, additional, and/or alternative conference modalities.

As shown in FIG. 7, modality processing module 716 receives first modality data 730. Modality processing module 716 processes first modality data 730 according to the particular configuration of modality processing module 716, as described further below (e.g., video processing/interfacing, shared content processing/interfacing, textual transcript processing/interfacing, etc.). For example, modality processing module 716 may perform one or more of video decoding (e.g., similar to video decoder 214), video/image optimization, etc. As shown in FIG. 7, modality processing module 716 generates processed first modality data 740. User interface generator 710 receives processed first modality data 740, and causes information (e.g., video, shared content, a textual transcript, etc.) in processed first modality data 740 to be displayed in the first output panel of user interface 712 in a live manner. In other words, the video, shared content, textual transcript, and/or other information of processed first modality data 740 is displayed in the first output panel during the live conference such that a user of device 700 can view the displayed information and interact with other participants in the conference in a live manner, with little or no delay from live action.

For instance, referring to FIG. 8, user interface generator 710 may display video information included in processed first modality data 740 in an output panel of user interface 712 similar to first panel 802. If processed first modality data 740 includes shared content data, user interface generator 710 may display shared content information in an output panel of user interface 712 similar to second panel 804. If processed first modality data 740 includes textual transcript data, user interface generator 710 may display textual transcript information in an output panel of user interface 712 similar to third panel 806.

As shown in FIG. 7, storage 706 may also receive processed first modality data 740. Storage 706 is an example of storage 502 shown in FIG. 5. Storage 706 may store processed first modality data 740 for subsequent access during conference replay, as described further below.

Referring back to FIG. 6, in step 608, audio based on audio data included in the received conferencing data is played in live form. As described above, in the example of FIG. 7, live conference processing module 704 includes audio processing module 718. Audio processing module 718 receives audio data 728. Audio processing module 718 processes audio data 728 and generates processed audio data 744. Audio processing module 718 may process audio data 728 in any manner to generate processed audio data 744, including providing gain, an equalization function, filtering, decoding, etc. Audio output system 714 receives processed audio data 744, and plays corresponding audio. Audio output system 714 may include a digital to analog (D/A) converter to convert digital processed audio data 744 to analog form, or a D/A converter may be included in audio processing module 718 or elsewhere in device 700 to perform the conversion. Furthermore, audio output system 714 may include one or more speakers (e.g., a headset, one or more free standing or mounted loudspeakers, etc.) configured to broadcast audio. Audio corresponding to processed audio data 744 is played by audio output system 714 during the live conference such that a user of device 700 can hear the audio (e.g., speech of other participants, etc.) and interact with other participants in the conference in a live manner, with little or no delay from live action. In an embodiment, audio may be played in a spatialized manner, as described in further detail below.

As shown in FIG. 7, storage 706 may also receive processed audio data 744. Storage 706 may store processed audio data 744 for subsequent access during conference replay, as described further below.

In step 610, a user is enabled to interact with the replay control panel to select a replay mode. For instance, referring to FIG. 7, a user of device 700 may interact with the replay control panel displayed by user interface 712 to select a replay mode for content of a live conference. Referring to FIG. 8, replay control panel 808 is an example of the replay control panel displayed in user interface 712, and is an example of replay control interface region 404 shown in FIG. 4. Replay control panel 808 enables the user of device 700 to replay of a portion (or entirety) of a conference to the user while the conference is live. As shown in FIG. 8, replay control panel 808 may include one or more user interface elements 816 that enable conference replay. User interface element(s) 816 may be configured to enable the user to start replay of a conference from the beginning or another point of time during the conference, to replay the conference at a normal (e.g., recorded) rate, a slower rate, or a faster rate, and/or to select one or more modalities of the conference for replay. By interacting with user interface element(s) 816, one or more windows and/or panels may be invoked and displayed by user interface 712 that enable one or more modalities of the live conference to be displayed in replay form. User interface element(s) may have any form mentioned elsewhere herein or otherwise known to enable conference replay.

Figure 9:
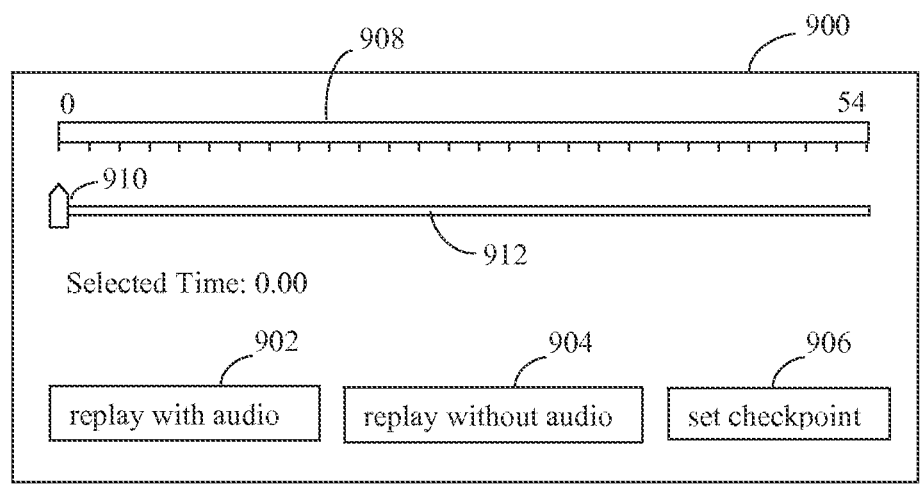
FIG. 9 shows a view of a replay control panel, according to an example embodiment.

For instance, FIG. 9 shows a view of a replay control panel 900, according to an example embodiment. Replay control panel 900 is an example of replay control panel 808 shown in FIG. 8, and is provided for purposes of illustration. As shown in FIG. 9, replay control panel 900 includes a plurality of user interface elements, including a first button 902, a second button 904, a third button 906, a conference progress timeline 908, and a time selection slider 910. Conference progress timeline 908 indicates a length of time that a conference has currently progressed in live form. In the example of FIG. 9, conference progress timeline 908 indicates that the conference has been active for 54 minutes, and this length of time indication is configured to increase with time as the conference progresses. The user may interact with slider 910 to select a point in time during the conference. As shown in FIG. 9, slider 910 may be slid along a rail 912 that is parallel to timeline 908 (e.g., by click and drag, by finger touch and drag on a touch screen, etc.). The user may slide slider 910 along rail 912 to a particular point of time during the conference as indicated by timeline 908 (to catch up to the live conference, the user may slide slider 910 all the way to the right end of rail 912). In the example of FIG. 9, slider 910 is adjacent to time "0", and thus the beginning of the conference is currently selected. As shown in FIG. 9, the selected time may be indicated in replay control panel by a time value indication (e.g., "Selected Time: 0:00").

In an embodiment, button 906 (e.g., labeled "set checkpoint") may be present to enable a user to set one or more checkpoints during the live conference. Such checkpoints may be set by the user for any reason, including to indicate time points during the live conference that the user is interrupted and/or may otherwise want to replay. To set a checkpoint, the user may slide slider 910 to a selected point of time, and may select button 906 (e.g., by mouse click, touch screen interaction, keyboard interaction, etc.) to cause a checkpoint flag to be indicated at the time selected by slider 910. If slider 910 is all the way at the right end of rail 912, the user may select button 906 to set a checkpoint flag at the current live conference time. Examples of a checkpoint flag include the text "checkpoint", a checkpoint icon (e.g., a flag icon), and/or other checkpoint symbol, which may be indicated on timeline 908, in a textual transcript, etc. As shown in FIG. 7, if a user sets a checkpoint flag using user interface 712, a checkpoint indication 752 is generated by user interface 712. Checkpoint indication 752 is provided through user interface generator 710 to replay processing module 708. Responsive to checkpoint indication 752, replay processing module 708 may store an indication of a checkpoint flag being applied to a particular time point of the live conference. In an embodiment, when a user selects button 906, a checkpoint flag entry (e.g., showing the text "checkpoint") may be entered into the textual transcript at the time indicated by slider 910.

Thus, checkpoint flags may be applied to content of a live conference in a manual fashion (e.g., by a user). In another embodiment, checkpoint flags and other types of user cues may be inserted into the textual transcript that are automatically generated. Such user cues may be generated to enable the users to locate and review "areas of interest" of a conference. A content data analyzer may be included in replay processing module 708, live conferencing processing module 704, or elsewhere in device 700 to analyze received conferencing data for such areas of interest. For example, as shown in FIG. 7, device 700 includes a conference data analyzer 754. Conference data analyzer 754 is configured to receive stored conferencing data 756 from storage 706 (or any one or more of data 728, 730, 740, and 744) to analyze conferencing data for areas of interest. Conference data analyzer 754 generates areas of interest indications 758, which may be stored in storage 706 in association with conferencing data to indicate the locations of determined areas of interest in the stored conferencing data. Indications 758 may subsequently be displayed in video, audio, shared content, and/or a textual transcript of the conference to highlight the areas of interest to users. Examples of such areas of interest that may be detected and highlighted are speech activities such as speech by particular participants, change events such as changes in presentation slides or other shared content, speaker change events, etc. For instance, processed audio data 744 in storage 706 may be analyzed by conference data analyzer 754 to determine speech activities, such as time points where a particular speaker begins speaking or stops speaking, etc. Such a determination may be made by analyzing recorded speech amplitude in the received conference data, and associating changes in such amplitude with particular participants determined according to speech recognition techniques and/or by identifying the source conferencing device. Processed first modality data 740 may be analyzed by conference data analyzer 754 to determine changes in video or shared content (e.g., determining abrupt changes in displayed image color and/or intensity to show changes in video/shared content, etc.). Indications 758 may be highlighted by being displayed as textual indications (e.g., in textual transcript, output video, output shared content), as audio sound/cues (in output audio), and/or as video cues (in output video and/or shared content).

As described above, a user of device 700 may interact with replay control panel 900 to initiate conference replay. For instance, the user may select one of buttons 902 and 904 to select a replay mode for the conference corresponding to the time selected by slider 910. By selecting button 902, which is labeled "replay with audio", a full conference replay mode may be initiated that includes audio replay as well as replay of any other available conference modalities. By selecting button 904, which is labeled "replay without audio", a partial conference replay mode may be initiated that includes replay of any available conference modalities except for audio. In the replay without audio mode, the audio associated with the conference replay is muted, and thus the user may refer to the textual transcript (if present) for words spoken during the conference replay.

Note that additional and/or alternative buttons than shown in FIG. 9 may be present in replay control panel 900 to enable further and/or alternative conference replay modes. Such buttons may be configured to enable replay of any one or more available conference modalities. For example, a "transcript-only" button may be present that may be selected to enter a transcript-only replay mode. In the transcript-only replay mode, users may be enabled to scroll through the textual transcript and read what was spoken in the conference during their absence, but are not presented with replays of other conference modalities. A "last checkpoint" button may be provided to automatically scroll through the textual transcript to the location of a closest previously set checkpoint. Automatic scrolling of the textual transcript may be disabled after a user selects the "last checkpoint" button or when they begin scrolling the transcript manually. Automatic scrolling of the transcript can be re-enabled by checking an "auto scroll" checkbox. Furthermore, a "pause" button may be present to enable a user to pause the conference, such that the user may be enabled to perform some other task while the conference continues to be recorded, but is not played to the user. The user may be provided with a "resume" button, such that the user is enabled to resume the conference at the point in time the pause button was selected. The user may also be enabled to select another time of the paused conference to begin play/replay.

Referring back to FIG. 6, in step 612, information associated with the first conferencing modality that corresponds to a time of the conference session prior to live is enabled to be displayed if a replay mode is selected. As shown in FIG. 7, if a user selects a replay mode using user interface 712, a conference replay request 746 is generated at user interface 712. Conference replay request 746 is provided through user interface generator 710 to replay processing module 708. Responsive to conference replay request 746, replay processing module 708 may initiate conference replay from an indicated time point (e.g., indicated by slider 910), according to the particular replay mode.

Figure 10:
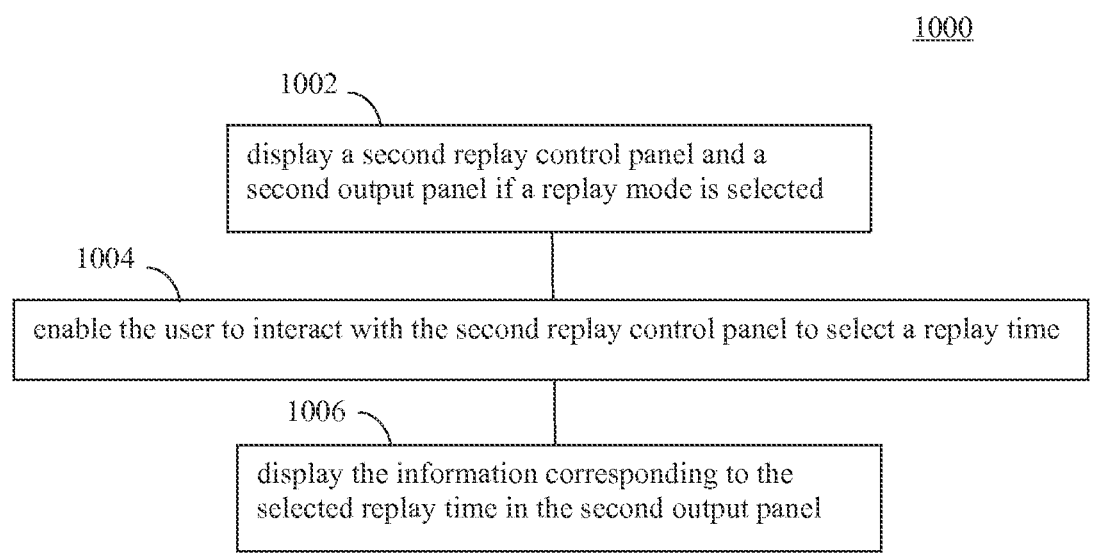
FIG. 10 shows a flowchart providing example steps for enabling conference replay, according to an example embodiment.

Conference replay may be enabled in various ways by replay processing module 708. For instance, FIG. 10 shows a flowchart 1000 providing example steps for enabling conference replay, according to an example embodiment. Flowchart 1000 may be performed during step 612 of flowchart 600, for example. Other structural and operational embodiments will be apparent to persons skilled in the relevant art(s) based on the discussion regarding flowchart 1000. Flowchart 1000 is described as follows.

Flowchart 1000 begins with step 1002. In step 1002, a second replay control panel and a second output panel are displayed if a replay mode is selected. For example, referring to FIG. 7, if a replay mode is selected by a user interacting with user interface 712 (e.g., according to step 610), a second replay control panel and a second output panel may be displayed. The second replay control panel may enable the user to control conference replay aspects, and the second output panel may display replay of a conference modality. Any number of additional output panels corresponding to any one or more of replayed video, textual transcripts, shared content, etc., may be displayed if a replay mode is selected.

Figure 11:
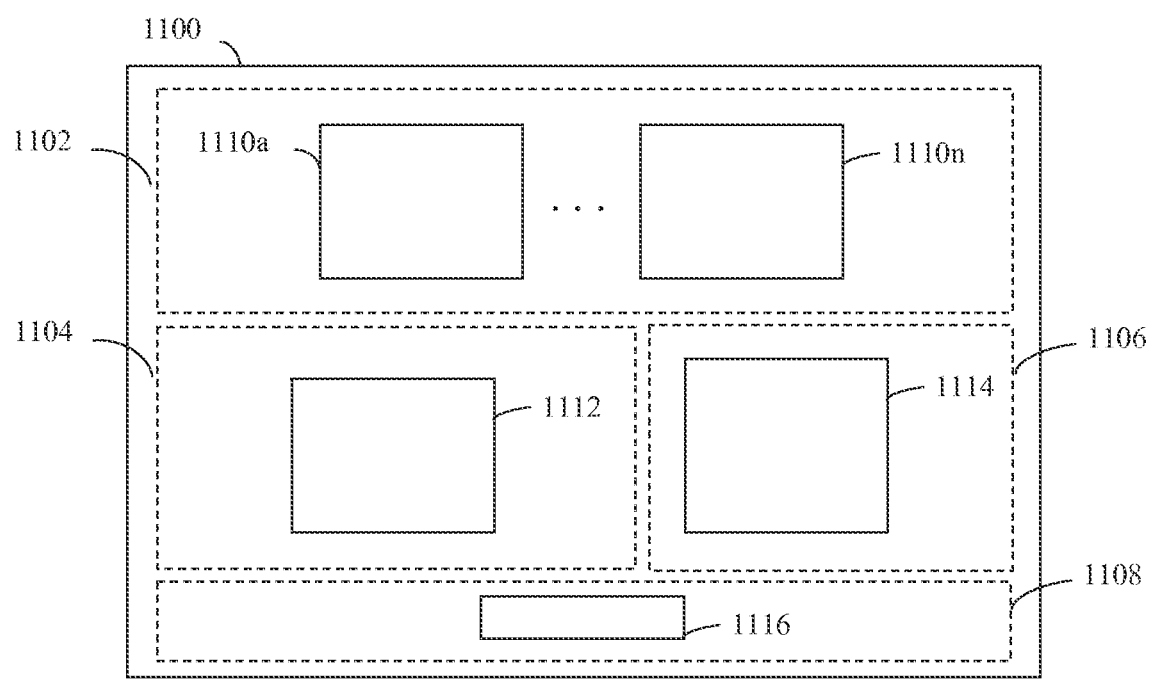
FIG. 11 shows a block diagram of a second user interface window configured to enable a user to perform conference replay, according to an example embodiment.

For instance, FIG. 11 shows a block diagram of a second user interface window 1100 configured to enable a user to perform conference replay, according to an example embodiment. Window 1100 is an example window that may be included in user interface 712 (FIG. 7). For instance, window 1100 and window 800 (FIG. 8) may be simultaneously displayed by a common display system, such that a user can view window 800 to interact with the conference in live form, and can view window 1100 to replay modalities of the conference (e.g., can switch their view from window 800 to window 1100, and vice versa, as desired). Window 1100 is provided for purposes of illustration, and is not intended to be limiting. Window 1100 may have other configurations, as would be apparent to persons skilled in the relevant art(s) from the teachings herein.

In the example of FIG. 11, window 1100 includes first-third replay output panels 1102, 1104, and 1106, which are associated with corresponding conference modalities, and a second replay control panel 1108 that enables a user to control aspects of conference replay. Panels 1102, 1104, 1106, and 1108 are described in terms of graphical "panels" for purposes of illustration, but may have any suitable form (e.g., including or not including boundary lines, etc.). Furthermore, although panel 1102 is shown in an upper location, panel 1104 is shown in a left side location, panel 1106 is shown in a right side location, and panel 1108 is shown in a lower location of window 1100 in FIG. 11, panels 1102, 1104, 1106, and 1108 may be arranged in window 1100 in any manner or pattern. Furthermore, panels 1102, 1104, 1106, and 1108 may have any relative sizes in window 1100.

In step 1004, the user is enabled to interact with the second replay control panel to select a replay time. As described above, a user may be enabled to select a replay time by interacting with replay control panel 808 shown in FIG. 8. For instance, referring to FIG. 9, the user may select a replay time using slider 910, and then may invoke conference replay (e.g., by selecting one of buttons 902 and 904). Alternatively, or additionally, the user may be able select or modify a replay time by interacting with the second replay control panel invoked in step 1002.

For instance, referring to FIG. 11, replay control panel 1108 is an example of the second replay control panel that may be invoked by selecting a conference replay mode. The user may interact with replay control panel 1108 to select and/or modify a replay time. As shown in FIG. 11, replay control panel 1108 may include one or more user interface elements 1116 that control conference replay. For instance, user interface element(s) 1116 may be configured to enable the user to start or change conference replay to a particular point of time during the conference, to replay the conference at a normal (e.g., recorded) rate, a slower rate, or a faster rate, and/or to select one or more modalities of the conference for replay. Replay control panel 1108 may include any number and combination of user interface elements 1116, mentioned elsewhere herein or otherwise known, to configure conference replay.

FIG. 12 shows a view of a replay control panel 1200, according to an example embodiment. Replay control panel 1200 is an example of replay control panel 1108 shown in FIG. 11, and is provided for purposes of illustration. As shown in FIG. 12, replay control panel 1200 includes a plurality of user interface elements, including a play speed radio button 1202, a current settings indicator 1204, a replay timeline 1206, a time selection slider 1208, a replay time indicator 1210, and a rail 1212. Replay timeline 1206 indicates a length of time that a conference has currently progressed in live form. In the example of FIG. 12, replay timeline 1206 indicates that the conference has been active for 54 minutes, and this length of time indication is configured to increase with time as the conference progresses. Replay time indicator 1210 is a graphical element that moves along timeline 1206 to indicate a time of the conference currently being replayed at any particular moment. The user may interact with slider 1208 to select a point in time during the conference. As shown in FIG. 12, slider 1208 may be slid along rail 1212 that is parallel to timeline 1206. The user may slide slider 1208 along rail 1212 to a particular point of time during the conference as indicated by timeline 1206. In the example of FIG. 12, slider 1208 is adjacent to time "0", and thus the beginning of the conference was selected. The user may move slider 1208 along rail 1212 to another point of time to have the conference beginning replay at the selected time.

Play speed radio button 1202 enables a user to select a replay rate for the modalities of the conference being replayed. For example, in FIG. 12, play speed radio button 1202 provides a plurality of predetermined replay rates, indicated as "Normal", "Fast", and "Faster." The user may select one of the provided replay rates. If the normal replay rate is selected, conference modalities are replayed at normal (e.g., real world) rates. If the fast replay rate is selected, conference modalities are replayed at a greater than normal (e.g., e.g., by a predetermined factor greater than 1.0). If the faster replay rate is selected, conference modalities are replayed at a rate faster than the fast replay rate. In the example of FIG. 12, the "Fast" replay rate is shown selected.

Current settings indicator 1204 indicates various current setting for conference replay. In the example of FIG. 12, current setting indicator 1204 indicates a currently selected time (by slider 1208) as "Selected Time: 0:00", a currently selected play speed as "Play Speed: 1.30" (e.g., a rate of 1.3 times normal speed), and a current play time as "Currently Playing: 7:30" (e.g., 7 minutes and 30 seconds from the beginning of the conference).

Note that the user interface elements shown in FIG. 12 (and FIG. 9) are provided for purposes of illustration, and are not intended to be limiting. Other types of user interface elements may alternatively be present. For instance, timeline 1206 and rail 1212 may be combined into a single timeline/rail, in an embodiment. Furthermore, in other embodiments, play speed may be selected using a slider bar or other user interface element, rather than using radio button 1202.

In step 1006, the information corresponding to the selected replay time is displayed in the second output panel. For example, referring to FIG. 7, information of the conference corresponding to the selected replay time (e.g., selected in step 1004) may be displayed in the second output panel provided by user interface 712. Replay processing module 708 is configured to retrieve and optionally process data of one or more conference modalities for replay. In the example of FIG. 7, replay processing module 708 includes a modality replay module 720 and an audio replay module 722. As such, replay processing module 708 is configured to enable audio and another conference modality (e.g., video, shared content, a textual transcript, etc.) to be replayed to a user of device 700. In alternative embodiments, fewer, additional, and/or alternative modules may be present in replay processing module 708 corresponding to fewer, additional, and/or alternative conference modalities.

As shown in FIG. 7, modality replay module 720 retrieves first modality replay data 738 from storage 706 beginning at the selected replay time. First modality replay data 738 is data of the modality to be replayed, corresponding to the selected replay time. Modality replay module 720 optionally processes first modality replay data 738 according to the particular configuration of modality replay module 720, as described further below (e.g., video processing/interfacing, shared content processing/interfacing, textual transcript processing/interfacing, etc.). Modality replay module 720 outputs/generates processed first modality replay data 748. User interface generator 710 receives processed first modality replay data 748, and causes information (e.g., video, shared content, a textual transcript, etc.) in processed first modality replay data 748 to be displayed in the corresponding replay output panel of user interface 712. In other words, the video, shared content, textual transcript, and/or other information of processed first modality replay data 748 is displayed in the replay output panel so that a user of device 700 can view replayed conference information while the conference is live and being provided to the user in live form in one or more other output panels (e.g., panels of window 800 of FIG. 8).

As described above, FIG. 11 includes example replay output panels corresponding to various example conference modalities. For instance, first replay output panel 1102 of window 1100 in FIG. 11 is a video replay output panel corresponding to video output panel 802 of FIG. 8 that displays replay of one or more video images received from other participating conference devices. For instance, FIGS. 13 and 14 show block diagrams of modality processing module 716 and modality replay module 720, according to an example video modality embodiment. As shown in FIG. 13, modality processing module 716 includes a video interface 1302. Video interface 1302 is configured to interface video data received in conferencing data stream 724 (e.g., video data of first modality data 730) with user interface generator 710 to be displayed in user interface 712 in live form. As shown in FIG. 14, modality replay module 720 includes a video retriever 1402. Video retriever 1402 is configured to retrieve video data received in conferencing data stream 724 and stored in storage 706 that corresponds to the selected replay start time, and to provide the retrieved video data to user interface generator 710 (in processed first modality replay data 748) to be replayed in user interface 712.

Thus, in an embodiment, while first output panel 802 of FIG. 8 displays live video associated with the conference, replay output panel 1102 of FIG. 11 may display conference video replayed from a time selected in replay control panel 1108. In the example of FIG. 11, video display regions 1110a-1110n are included in first replay output panel 1102. Thus, replays of the video feeds transmitted from remote conference devices may be displayed in video display regions 1110a-1110n.

In the current example, second replay output panel 1104 of window 1100 is a shared content replay output panel that displays replayed shared content 1112 (e.g., a desktop view, etc.). Second replay output panel 1104 corresponds to second output panel 804 of FIG. 8, which displays shared content 812 in a live manner. For instance, FIGS. 15 and 16 show block diagrams of modality processing module 716 and modality replay module 720, according to an example shared content modality embodiment. As shown in FIG. 15, modality processing module 716 includes a shared content interface 1502. Shared content interface 1502 is configured to interface shared data received in conferencing data stream 724 (e.g., shared content data of first modality data 730) with user interface generator 710 to be displayed in user interface 712 in a live manner. As shown in FIG. 16, modality replay module 720 includes a shared content retriever 1602. Shared content retriever 1602 is configured to retrieve shared data received in conferencing data stream 724 and stored in storage 706 that corresponds to the selected replay start time, and to provide the retrieved shared content data to user interface generator 710 (in processed first modality replay data 748) to be replayed in user interface 712.

Thus, in an embodiment, while second output panel 804 of FIG. 8 displays live shared content associated with the conference, replay output panel 1104 of FIG. 11 may display conference shared content replayed from a time selected in replay control panel 1108.

In the current example, third replay output panel 1106 of window 1100 is a transcript panel that displays a textual transcript 1114 of the current conference in replay form. Third replay output panel 1106 corresponds to third output panel 806 of FIG. 8, which displays textual transcript 814 in a live manner. For instance, FIGS. 17 and 18 show block diagrams of modality processing module 716 and modality replay module 720, according to an example textual transcript modality embodiment. As shown in FIG. 17, modality processing module 716 includes a textual transcript interface 1702. Textual transcript interface 1702 is configured to interface textual transcript data received in conferencing data stream 724 (e.g., a textual transcript of first modality data 730) or generated in device 700 with user interface generator 710 to be displayed in user interface 712 in a live manner. As shown in FIG. 18, modality replay module 720 includes a textual transcript retriever 1802. Textual transcript retriever 1802 is configured to retrieve textual transcript data in storage 706 that corresponds to the selected replay start time, and to provide the retrieved textual transcript data to user interface generator 710 (in processed first modality replay data 748) to be replayed in user interface 712.

Thus, in an embodiment, while third output panel 806 of FIG. 8 displays a live textual transcript associated with the conference, replay output panel 1106 of FIG. 11 may display a textual transcript of the conference replayed from a time selected in replay control panel 1108.

In an embodiment, audio associated with a conference session corresponding to the selected replay time may be replayed. For example, as shown in FIG. 7, audio replay module 722 retrieves replay audio data 736 stored in storage 706 (as processed audio data 744) beginning at the selected replay time. Audio replay module 722 optionally processes replay audio data 736 (e.g., decoding, equalization, filtering, amplifying, etc.). Furthermore, audio replay module 722 may be configured to modify replay audio data 736 to modify a replay rate of audio data (e.g., increase the replay rate from normal, decrease the replay rate from normal, etc.) according to user input (e.g., to a user interface, as described elsewhere herein). For instance, to solve audio pitch and understandability issues that arise when audio is played back at an accelerated rate, audio replay module 722 may implement audio speed-up technology that employs pitch correction and silence adjustment techniques to make sure that replayed audio sounds meaningful even when played at a faster rate. Audio replay module 722 outputs/generates processed replay audio data 750. Audio output system 714 receives processed replay audio data 750, and plays corresponding audio. In other words, the audio of processed replay audio data 750 is played by audio output system 714 so that a user of device 700 can hear replayed conference audio while the conference is live. Live conference audio may simultaneously be provided to the user by audio output system 714 (which receives processed audio data 744).

FIG. 19 shows a block diagram of audio processing module 716, according to an example embodiment. As shown in FIG. 19, audio processing module 716 includes an audio interface 1902. Audio interface 1902 is configured to interface audio data received in conferencing data stream 724 (e.g., audio data 728) with audio output system 714 to be played by audio output system 714 in a live manner. FIG. 20 shows a block diagram of audio replay module 722, according to an example embodiment. As shown in FIG. 20, audio replay module 722 includes an audio retriever 2002. Audio retriever 2002 is configured to retrieve the audio data received in conferencing data stream 724 and stored in storage 706 that corresponds to the selected replay start time, and to provide the retrieved audio data to audio output system 714 (in processed replay audio data 750) to be replayed by audio output system 714.

In one embodiment, the live conference audio may optionally be muted while the replay conference audio is being played by audio output system 714. In another embodiment, the replay conference audio may be muted while live conference audio is being played by audio output system 714. In another embodiment, the live conference audio and replay conference audio may be played by audio output system 714 simultaneously. For example, in one embodiment, the live conference audio and replay conference audio may be played simultaneously from the same one or more speakers of audio output system 714. Alternatively, the live conference audio and replay conference audio may be played through different speakers of audio output system 714, or may be played through the same set of speakers, but in a spatialized manner. In this manner, the user may be better enabled to distinguish the live conference audio from the replay conference audio.

For instance, FIG. 21 shows a portion of device 700, according to an example embodiment. As shown in FIG. 21, device 700 may include an audio spatialization module 2102 used to spatialize the live conference audio and the replay conference audio. For example, as shown in FIG. 21, audio spatialization module 2102 receives processed audio data 744 (e.g., "live" audio) and processed replay audio data 750 (e.g., "replay" audio). Audio spatialization module 2102 is configured to perform techniques of audio spatialization to provide the live conference audio and replay conference audio with different audio angles of arrival so that the user may be enabled to distinguish the live conference audio from the replay conference audio. Such techniques of audio spatialization that may be used by audio spatialization module 2102 are known to persons skilled in the relevant art(s).

As shown in FIG. 21, audio spatialization module 2102 generates first and second output audio signals 2106a and 2106b, which are respectively received by a first audio output device 2104a and a second audio output device 2104b of audio output system 714. In an embodiment, first and second output audio signals 2106a and 2106b respectively include the live conference audio and the replay conference audio. In such an embodiment, first audio output device 2104a broadcasts live conference audio, and second audio output device 2104b broadcasts replay conference audio. In another embodiment, first and second output audio signals 2106a and 2106b each contain both of live conference audio and replay conference audio, with their respective amplitudes and/or phases modified to cause the live conference audio and replay conference audio to be perceived as being received from predetermined desired angles of arrival. In further embodiments, audio output system 714 may include further audio output devices to enable further audio spatialization. First and second audio output devices 2104a and 2104b may be any type of audio output device, including a headphone speaker pair (e.g., right and left ear speakers), free standing loudspeakers, mounted loudspeakers, etc.

In an embodiment, live conference processing module 704 or replay processing module 708 may be configured to generate summary information associated with a live conference. For example, as shown in FIG. 22, replay processing module 708 (or live conference processing module 704) may include a conference summary generator 2202. Conference summary generator 2202 is configured to generate a concise description of the live conference as the conference is being performed. For example, conference summary generator 2202 may be configured to receive a textual transcript of the conference (e.g., textual transcript 814) from storage 706 or elsewhere, and to generate a concise description of the textual transcript in one or more forms, such as a keyword cloud (e.g., by searching for frequently used words) or a relatively short (or any other length) summary of the conference session. The generated concise description may be displayed to the user in user interface 712, and the user may interact with the concise description to navigate quickly within the textual transcript. For instance, the user may be enabled to select a keyword in the keyword cloud or short summary to cause textual transcript 1114 to scroll to the next instance of the keyword in textual transcript 1114. Keywords of the keyword cloud may be indicated in the keyword cloud with different weights (e.g., text size, text color, etc.) to indicate relative importance (e.g., frequency) of the keywords.

For instance, the generated concise description, such as the keyword cloud, the text summary, and/or an event change index (e.g., that tracks speaker change events, content change events, etc.) may be used to as a way to control where in the conference to start replay, and/or may be used as an indicator of a topic and/or the point in time at which the live meeting is taking place and of a topic and/or the point in time is at which the conference is currently being replayed. For instance, the keyword cloud may highlight a first word in a first manner (e.g., the word is bolded, is changed to a selected first color, etc.) that represents/indicates a topic currently being discussed in the live meeting, and may highlight a second word (e.g., the word is italicized, is changed to a selected second color, etc.) that represents/indicates a topic being discussed in the portion of the conference being replayed.

In an embodiment, a user status may be displayed by user interface 712 for each user of the conference (e.g., except for the local user, optionally), so that each user can determine the statuses of the other users. When the user is live with the conference (not pausing or replaying the conference), the user's status may be indicated as "active" or as some other suitable indication. If a user pauses a conference, as described above, the user's status may be indicated as in a "pause" mode. If the user is replaying a conference, the user's status may be indicated as in a "replay" mode. A user status may be indicated in any manner, including being shown as an icon, a textual description, a color, etc., in association with an identifier (e.g., a name) for the user. In an embodiment, a user may not desire other users to know the user's status (e.g., does not want other users to know the user is in pause or replay mode). In such case, a user may be enabled to disable status mode changes for the user. In an embodiment, if the user does not desire other users to know that the user is not actively participating in the conference, video of the user may be frozen or repeated (e.g., looped) to cause it to appear at other participating devices in the conference that the user is actively participating.

III. Additional Embodiments

In an embodiment, a conferencing system comprises: a user interface generator configured to generate a user interface that includes a replay control panel and a first output panel, the replay control panel being configured to enable a user to select a replay mode by interacting with the replay control panel; a live conference processing module configured to receive conferencing data associated with a conference session, to extract information included in the received conferencing data that is associated with a first conferencing modality to be displayed in the first output panel in a live manner, and to extract audio data included in the received conferencing data to be played as audio in the live manner; and a replay processing module configured to enable information associated with the first conferencing modality that corresponds to a time of the conference session prior to live to be presented if a replay mode is selected.

The first conferencing modality may be a textual transcript modality. The live conference processing module may be configured to enable a textual transcript of the conference session to be displayed in the first output panel in the live manner. The replay processing module may be configured to receive a replay time selected by a user that interacts with the replay control panel, and to enable text of the textual transcript corresponding to the selected replay time to be displayed.

The system may further include a conference summary generator configured to generate from the textual transcript at least one of a keyword cloud or a summary of the conference session. The keyword cloud or the summary of the conference session may indicate one or more of the selected replay time, a topic of the conference session being discussed live, or a topic of the conference session being discussed at the selected replay time.

The system may further include a conference data analyzer configured to analyze at least one of the audio data or the information associated with the first conferencing modality to determine at least one of a speech activity, a speaker change event, or a content change event. The speech activity, the speaker change event, or the content change event may be presented to a user.

The first conferencing modality may also be a video modality. The live conference processing module may be configured to enable video received from at least one remote participant of the conference session to be displayed in the first output panel in the live manner. The replay processing module may be configured to receive a replay time selected by a user that interacts with the replay control panel, and to enable video received from at least one remote participant of the conference session corresponding to the selected replay time to be displayed.

The first conferencing modality may also be a shared content modality. The live conference processing module may be configured to enable shared content received from at least one participant of the conference session to be displayed in the first output panel in the live manner. The replay processing module may be configured to receive a replay time selected by a user that interacts with the replay control panel, and to enable shared content received from at least one participant of the conference session corresponding to the selected replay time to be displayed.

The user interface generator may be configured to generate a second replay control panel and a second output panel if a replay mode is selected. The replay processing module may be configured to receive a replay time selected by a user that interacts with the second replay control panel, to display information associated with the first conferencing modality corresponding to the selected replay time in the second output panel, and to play audio associated with the conference session corresponding to the selected replay time.

The replay processing module may be configured to display the information in the second output panel at a first rate that is different from a second rate at which the information in the first output panel in displayed, to mute the audio played live, and to play the audio corresponding to the selected replay time at the first rate.

The replay control panel may be configured to enable a user to indicate a time point of the conference session with a checkpoint flag. The user may be enabled to select the indicated time point as the replay time.

The system may further include an audio spatialization module configured to spatialize the audio played live differently from the audio played corresponding to the selected replay time.

In another embodiment, a method may comprise receiving conferencing data associated with a conference session; generating a user interface that includes a replay control panel and a first output panel; displaying information included in the received conferencing data that is associated with a first conferencing modality in the first output panel in a live manner; playing audio based on audio data included in the received conferencing data in the live manner; enabling a user to interact with the replay control panel to select a replay mode; and enabling information associated with the first conferencing modality that corresponds to a time of the conference session prior to live to be displayed if a replay mode is selected.

Enabling a user to interact with the replay control panel to select a replay mode may comprise enabling a user to select at least one of a transcript-only replay mode, a replay without audio mode, or a full replay mode.

The first conferencing modality may be a textual transcript modality. Displaying may comprise displaying a textual transcript of the conference session in the first output panel in the live manner. Enabling information associated with the first conferencing modality that corresponds to a time of the conference session prior to live to be displayed if a replay mode is selected may comprise: displaying a second replay control panel and a second output panel if a replay mode is selected, enabling the user to interact with the second replay control panel to select a replay time, and displaying text of the textual transcript corresponding to the selected replay time in the second output panel.

The method may further comprise: generating from the textual transcript at least one of a keyword cloud or a summary of the conference session; displaying the generated at least one of the keyword cloud or the summary in the user interface; and indicating at least one of the selected replay time, a topic of the conference session being discussed live, or a topic of the conference session being discussed at the selected replay time in the generated at least one of the keyword cloud or the summary.

The first conferencing modality may be a video modality, where the display step comprises displaying video received from at least one remote participant of the conference session in the first output panel in the live manner. The enabling information associated with the first conferencing modality that corresponds to a time of the conference session prior to live to be displayed if a replay mode is selected may comprise: displaying a second replay control panel and a second output panel if a replay mode is selected, enabling the user to interact with the second replay control panel to select a replay time, and displaying video received from at least one remote participant of the conference session corresponding to the selected replay time in the second output panel.

The first conferencing modality may be a shared content modality, where the display step comprises: displaying shared content received from at least one participant of the conference session in the first output panel in the live manner. The enabling information associated with the first conferencing modality that corresponds to a time of the conference session prior to live to be displayed if a replay mode is selected may comprise: displaying a second replay control panel and a second output panel if a replay mode is selected, enabling the user to interact with the second replay control panel to select a replay time, and displaying shared content received from at least one participant of the conference session corresponding to the selected replay time in the second output panel.

Enabling information associated with the first conferencing modality that corresponds to a time of the conference session prior to live to be displayed if a replay mode is selected may comprise: displaying a second replay control panel and a second output panel if a replay mode is selected, enabling the user to interact with the second replay control panel to select a replay time, displaying information associated with the first conferencing modality corresponding to the selected replay time in the second output panel, and playing audio associated with the conference session corresponding to the selected replay time.

Displaying information associated with the first conferencing modality corresponding to the selected replay time in the second output panel may comprise: displaying the information in the second output panel at a first rate that is different from a second rate at which the information is displayed in the first output panel. Playing audio associated with the conference session corresponding to the selected replay time may comprise enabling the audio corresponding to the selected replay time to be played at the first rate.

The method may further comprise enabling a user to interact with the replay control panel to indicate a time point of the conference session with a checkpoint flag. Enabling the user to interact with the second replay control panel to select a replay time may comprise enabling the user to select the indicated time point as the replay time.

In another embodiment, a conference device may comprise: at least one storage device configured to store received conferencing data associated with a conference session; a display device; an audio output device; a user interface generator configured to generate a user interface displayed at the display device that includes a replay control panel and a first output panel; a live conference processing module, which may include a first modality processing module and an audio processing module, and a replay processing module.

A first modality processing module may be configured to extract information included in the received conferencing data that is associated with a first conferencing modality to be displayed in the first output panel in a live manner. An audio processing module may be configured to extract audio data included in the received conferencing data to be played by the audio output device as audio in the live manner. The replay control panel may be configured to enable a user to select a replay mode by interacting with the replay control panel. The replay processing module may be configured to enable information associated with the first conferencing modality that corresponds to a time of the conference session prior to live to be displayed if a replay mode is selected.

IV. Example Conferencing Device Embodiments

Replay processing module 504, replay request interface 506, render module 508, live conference processing module 704, replay processing module 708, user interface generator 710, modality processing module 716, audio processing module 718, modality replay module 720, audio replay module 722, conference data analyzer 754, video interface 1302, video retriever 1402, shared content interface 1502, shared content retriever 1602, textual transcript interface 1702, textual transcript retriever 1802, audio interface 1902, audio retriever 2002, audio spatialization module 2102, and conference summary generator 2202 may be implemented in hardware, software, firmware, or any combination thereof. For example, replay processing module 504, replay request interface 506, render module 508, live conference processing module 704, replay processing module 708, user interface generator 710, modality processing module 716, audio processing module 718, modality replay module 720, audio replay module 722, conference data analyzer 754, video interface 1302, video retriever 1402, shared content interface 1502, shared content retriever 1602, textual transcript interface 1702, textual transcript retriever 1802, audio interface 1902, audio retriever 2002, audio spatialization module 2102, and/or conference summary generator 2202 may be implemented as computer program code configured to be executed in one or more processors. Alternatively, replay processing module 504, replay request interface 506, render module 508, live conference processing module 704, replay processing module 708, user interface generator 710, modality processing module 716, audio processing module 718, modality replay module 720, audio replay module 722, video interface 1302, video retriever 1402, shared content interface 1502, shared content retriever 1602, textual transcript interface 1702, textual transcript retriever 1802, audio interface 1902, audio retriever 2002, audio spatialization module 2102, and/or conference summary generator 2202 may be implemented as hardware logic/electrical circuitry.

Figure 23:
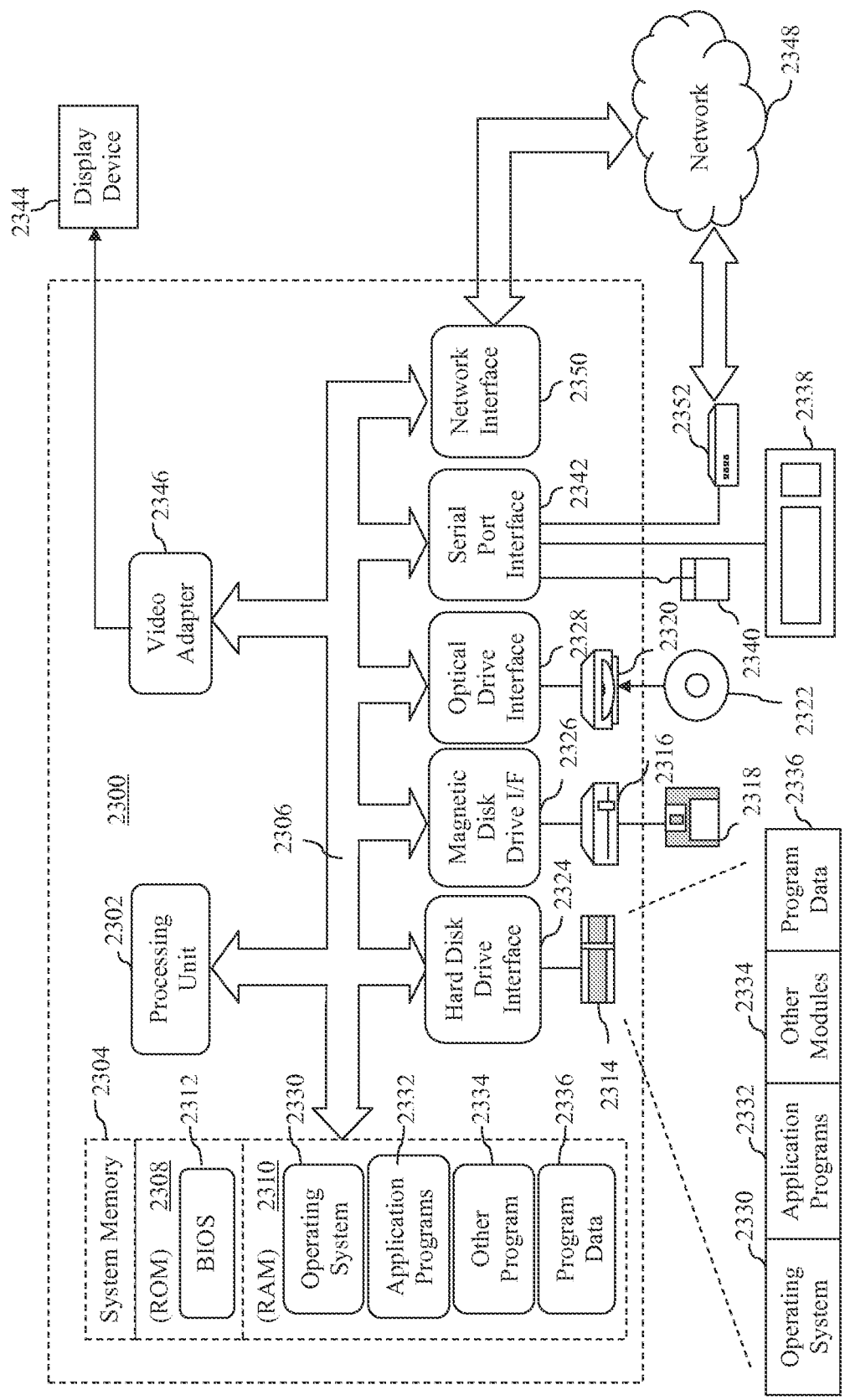
FIG. 23 shows a block diagram of an example computer that may be used to implement embodiments of the present invention.

FIG. 23 depicts an exemplary implementation of a computer 2300 in which embodiments of the present invention may be implemented. For example, conference-enabled devices 104a-104n, conference server 102, conference replay system 500, and conference-enabled device 700 may each be implemented in one or more computers 2300 that includes one or more features of computer 2300 shown in FIG. 23 and/or alternative features. Computer 2300 may be a general-purpose computing device in the form of a conventional personal computer, a mobile computer, or a workstation, for example, or computer 2300 may be a special purpose computing device mentioned elsewhere herein or otherwise known. The description of computer 2300 provided herein is provided for purposes of illustration, and is not intended to be limiting. Embodiments of the present invention may be implemented in further types of computer systems, as would be known to persons skilled in the relevant art(s).

As shown in FIG. 23, computer 2300 includes a processing unit 2302, a system memory 2304, and a bus 2306 that couples various system components including system memory 2304 to processing unit 2302. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

Computer 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2330, one or more application programs 2332, other program modules 2334, and program data 2336. Application programs 2332 or program modules 2334 may include, for example, computer program logic for implementing replay processing module 504, replay request interface 506, render module 508, live conference processing module 704, replay processing module 708, user interface generator 710, modality processing module 716, audio processing module 718, modality replay module 720, audio replay module 722, conference data analyzer 754, video interface 1302, video retriever 1402, shared content interface 1502, shared content retriever 1602, textual transcript interface 1702, textual transcript retriever 1802, audio interface 1902, audio retriever 2002, audio spatialization module 2102, conference summary generator 2202, flowchart 600, and/or flowchart 1000, (including any step of flowcharts 600 and 1000).

A user may enter commands and information into the computer 2300 through input devices such as keyboard 2338 and pointing device 2340. Other input devices (not shown) may include a microphone, joystick, game pad, satellite dish, scanner, or the like. These and other input devices are often connected to the processing unit 2302 through a serial port interface 2342 that is coupled to bus 2306, but may be connected by other interfaces, such as a parallel port, game port, or a universal serial bus (USB).

A display device 2344 is also connected to bus 2306 via an interface, such as a video adapter 2346. In addition to the monitor, computer 2300 may include other peripheral output devices (not shown) such as speakers and printers.

Computer 2300 is connected to a network 2348 (e.g., the Internet) through an adaptor or network interface 2350, a modem 2352, or other means for establishing communications over the network. Modem 2352, which may be internal or external, is connected to bus 2306 via serial port interface 2342.

As used herein, the terms "computer program medium" and "computer-readable medium" are used to generally refer to media such as the hard disk associated with hard disk drive 2314, removable magnetic disk 2318, removable optical disk 2322, as well as other media such as flash memory cards, digital video disks, random access memories (RAMs), read only memories (ROM), and the like.

As noted above, computer programs and modules (including application programs 2332 and other program modules 2334) may be stored on the hard disk, magnetic disk, optical disk, ROM, or RAM. Such computer programs may also be received via network interface 2350 or serial port interface 2342. Such computer programs, when executed or loaded by an application, enable computer 2300 to implement features of embodiments of the present invention discussed herein. Accordingly, such computer programs represent controllers of the computer 2300.

Embodiments of the invention are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A conferencing system, comprising:
a conference server configured to collect conferencing data associated with a multi-party conference session, the multi-party conference session having participants including a first participant and a second participant, the conferencing data including content generated or shared by the participants during the course of the conference session, the conference server configured to combine and redistribute the content back to the participants; and
the conference server configured to generate from the conferencing data a keyword cloud that includes a display of weighted textually descriptive keywords based at least in part on the collected content, and to display the keyword cloud in a first output panel, the displayed keyword cloud being interactive such that keywords in the keyword cloud are selectable, the conference server further comprising:
a replay processing module configured to replay a prior portion of the multi-party conference session via a second output panel while the first participant and the second participant continue to engage in the multi-party conference session via a third output panel.

2. The conferencing system of claim 1, wherein the conference server is configured to generate and display the keyword cloud in a live manner during the multi-party conference session.

3. The conferencing system of claim 1, wherein the conference server generates weights for the keywords in the keyword cloud to indicate relative importance of the keywords.

4. The conferencing system of claim 3, wherein the conference server distinguishes a first keyword in the keyword cloud from a second keyword in the keyword cloud based on a frequency of the first and second keywords present in the collected content.

5. The conferencing system of claim 1, wherein the conference server is further configured to display a first conferencing modality associated with the multi-party conference session in a user interface in a live manner.

6. The conferencing system of claim 1, wherein the conference server is further configured to include a replay control panel in a user interface, the replay control panel being configured to enable a user to select a replay mode by interacting with the replay control panel.

7. The conferencing system of claim 6, the conference server is configured to generate the second output panel if the replay mode is selected; and
the replay processing module further configured to replay the prior portion in the second output panel simultaneous with display of the keyword cloud in the first output panel in a live manner.

8. A method, comprising:
collecting conferencing data associated with a multi-party conference session, the multi-party conference session having participants that include a first participant and a second participant, the conferencing data including content generated or shared by the participants during the course of the conference session;

combining and redistributing the content back to the participants, including:

generating from the conferencing data a keyword cloud that includes a display of textually descriptive keywords based at least in part on the collected content, generating a user interface that includes a first output panel, and displaying the generated keyword cloud in the first output panel, the displayed keyword cloud being interactive such that keywords in the keyword cloud are selectable; and replaying a prior portion of the multi-party conference session via a second output panel while the first participant and the second participant continue to engage in the multi-party conference session via a third output panel.

9. The method of claim 8, wherein said displaying the generated keyword cloud comprises:

displaying the keyword cloud in a live manner during the multi-party conference session.

10. The method of claim 8, wherein said generating from the conferencing data a keyword cloud that includes a display of textually descriptive keywords based at least in part on the collected content comprises:

generating weights for the keywords in the keyword cloud to indicate relative importance of the keywords.

11. The method of claim 8, further comprising:

distinguishing a first keyword in the keyword cloud from a second keyword in the keyword cloud based on a frequency of the first and second keywords present in the collected content.

12. The method of claim 8, further comprising:

displaying a first conferencing modality associated with the multi-party conference session in a user interface in a live manner.

13. The method of claim 8, further comprising:

displaying a replay control panel configured to enable selection of a replay mode by user interaction with the replay control panel.

14. The method of claim 13, further comprising:

generating the second output panel if the replay mode is selected; and replaying the prior portion in the second output panel simultaneously with display of the keyword cloud in the first output panel in a live manner.

15. A conferencing device, comprising:

at least one storage device configured to store collected conferencing data associated with a conference session;

a display device;

a live conference conferencing module configured to collect conferencing data associated with a multi-party conference session, the multi-party conference session having participants including a first participant and a second participant, the conferencing data including content generated or shared by the participants during the course of the conference session;

a conference summary generator configured to generate from the conferencing data a keyword cloud that includes a display of weighted textually descriptive keywords based at least in part on the collected content, and to display the generated keyword cloud in a first output panel displayed by the display device, the displayed keyword cloud being interactive such that keywords in the keyword cloud are selectable; and a replay processing module configured to replay a prior portion of the multi-party conference session via a second output panel while the first participant and the second participant continue to engage in the multi-party conference session via a third output panel.

16. The conferencing device of claim 15, wherein the conference summary generator generates weights for the keywords in the keyword cloud to indicate relative importance of the keywords.

17. The conferencing device of claim 15, wherein the conference summary generator distinguishes a first keyword in the keyword cloud from a second keyword in the keyword cloud based on a frequency of the first and second keywords present in the collected content.

18. The conferencing device of claim 15, further comprising:

a user interface generator configured to include a replay control panel in a user interface, the replay control panel configured to enable a user to select a replay mode by interacting with the replay control panel.

19. The conferencing device of claim 15, wherein the replay processing module is configured to display a replay control panel configured to enable selection of a replay mode by user interaction with the replay control panel.

20. The conferencing device of claim 19, wherein the replay processing module is configured to replay the prior portion in the second output panel in the replay mode simultaneous with display of the keyword cloud in the first output panel in a live manner.

* * * * *